(12) United States Patent
Kashima

(10) Patent No.: US 7,202,926 B2
(45) Date of Patent: Apr. 10, 2007

(54) CHOLESTERIC REFLECTIVE RETARDATION OPTICAL ELEMENT WITH DIRECTORS AT TOP SURFACE OF OPTICAL ELEMENT PARALLEL TO THOSE AT THE BOTTOM SURFACE OF THE OPTICAL ELEMENT

(75) Inventor: Keiji Kashima, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/606,286

(22) Filed: Jun. 26, 2003

(65) Prior Publication Data

US 2004/0136066 A1    Jul. 15, 2004

(30) Foreign Application Priority Data

Aug. 26, 2002    (JP)    ............... 2002-245674

(51) Int. Cl.
*G02F 1/1335*    (2006.01)
(52) U.S. Cl. ................ 349/117; 349/115; 349/175; 349/176
(58) Field of Classification Search ........... 349/168, 349/175, 181, 185, 18, 117, 129, 115
See application file for complete search history.

(56) References Cited

U.S. PATENT DOCUMENTS

| | | | | |
|---|---|---|---|---|
| 4,385,806 A | * | 5/1983 | Fergason | 349/34 |
| 5,241,408 A | * | 8/1993 | Ishikawa et al. | 349/76 |
| 5,619,352 A | * | 4/1997 | Koch et al. | 349/89 |
| 5,688,566 A | * | 11/1997 | Broer et al. | 428/1.31 |
| 5,863,457 A | * | 1/1999 | Hasebe et al. | 252/299.01 |
| 5,876,837 A | * | 3/1999 | Sailer et al. | 428/195.1 |
| 6,674,505 B1 | * | 1/2004 | Van De Witte et al. | 349/172 |
| 6,795,139 B1 | * | 9/2004 | Kameyama et al. | 349/96 |

(Continued)

FOREIGN PATENT DOCUMENTS

JP    57-165480    10/1982

(Continued)

*Primary Examiner*—Andrew Schechter
*Assistant Examiner*—Phu Vu
(74) *Attorney, Agent, or Firm*—Oliff & Berridge, PLC

(57) ABSTRACT

Provided herein is a retardation optical element 10 that produces no bright and dark fringes on a displayed image even when placed between a liquid crystal cell 104 and a polarizer 102B and thus can effectively prevent lowering of display quality. The retardation optical element 10 includes a retardation layer 12 having a cholesteric-regular molecular structure with liquid crystalline molecules in planar orientation. The helical pitch in the molecular structure of the retardation layer 12 is so adjusted that the retardation layer 12 can, owing to its molecular structure, selectively reflect light whose wavelength falls in a range different from the wave range of light incident on the retardation layer 12 (the selective reflection wave range of the retardation layer is either shorter or longer than the wave range of the incident light). Further, the retardation layer 12 has two opposite main surfaces (larger surfaces) 12A and 12B that are perpendicular to each other in the direction of thickness, where the directions of the directors Da of the liquid crystalline molecules on the entire area of the one surface 12A are substantially the same, and those of the directors Db of the liquid crystalline molecules on the entire area of the other surface 12B are also substantially the same.

18 Claims, 9 Drawing Sheets

U.S. PATENT DOCUMENTS 6,800,220 B2 * 10/2004 Yumoto et al. ........ 252/299.01

FOREIGN PATENT DOCUMENTS

| JP | 3-67219 | 3/1991 |
|----|---------|--------|
| JP | 4-322223 | 11/1992 |
| JP | 7-258638 | 10/1995 |
| JP | 9-133810 | 5/1997 |
| JP | 10-508882 | 9/1998 |
| JP | 11-160539 | 6/1999 |
| JP | 11-293252 | 10/1999 |
| JP | 2000-387682 | * 12/2000 |

* cited by examiner

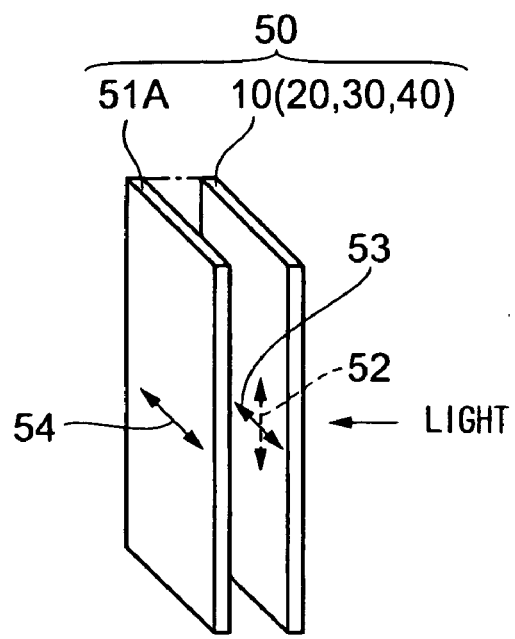
F I G. 10
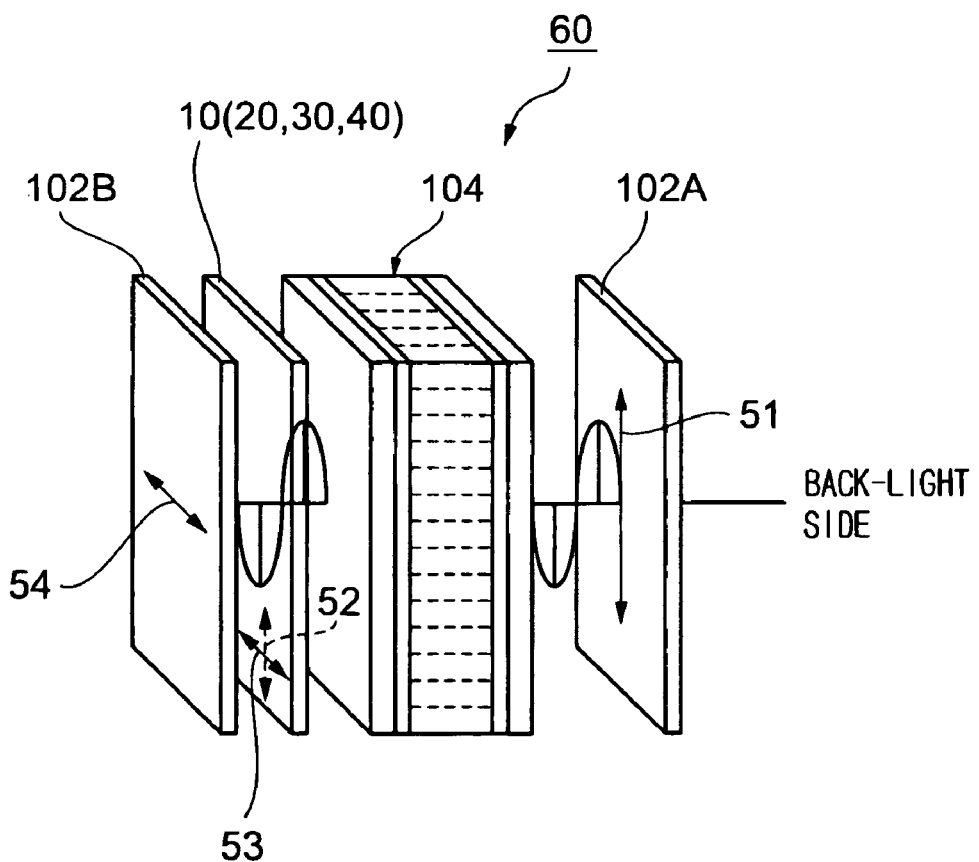
F I G. 11

CHOLESTERIC REFLECTIVE RETARDATION OPTICAL ELEMENT WITH DIRECTORS AT TOP SURFACE OF OPTICAL ELEMENT PARALLEL TO THOSE AT THE BOTTOM SURFACE OF THE OPTICAL ELEMENT

BACKGROUND OF THE INVENTION

1. Field of the Invention

The present invention relates to a retardation optical element for use in a liquid crystal display or the like, especially a retardation optical element that includes a retardation layer having a cholesteric-regular molecular structure and can compensate for the state of polarization of light that slantingly emerges from a liquid crystal cell in the direction deviating from its normal, to a method of producing the retardation optical element, and to a polarization element and a liquid crystal display, each including the retardation optical element.

2. Description of Related Art

FIG. 13 is a diagrammatic exploded perspective view of a conventional, general liquid crystal display.

As shown in FIG. 13, the conventional liquid crystal display 100 includes a polarizer 102A on the incident side, a polarizer 102B on the emergent side, and a liquid crystal cell 104.

Of these component parts, the polarizers 102A and 102B are so constructed that they selectively transmit only linearly polarized light having the plane of vibration in a predetermined direction, and are arranged in the cross nicol disposition so that the direction of vibration of the linearly polarized light transmitted by the polarizer 102A is perpendicular to that of vibration of the linearly polarized light transmitted by the polarizer 102B. The liquid crystal cell 104 include a large number of cells corresponding to pixels, and is placed between the polarizers 102A and 102B.

A case where the liquid crystal cell 104 in the above-described liquid crystal display 100 is of VA (Vertical Alignment) mode, which a nematic liquid crystal having negative dielectric anisotropy is sealed in a liquid crystal cell, is now taken as an example. Linearly polarized light that has passed through the polarizer 102A on the incident side passes, without undergoing phase shift, through those cells in the liquid crystal cell 104 that are in the non-driven state, and is blocked by the polarizer 102B on the emergent side. On the contrary, the linearly polarized light undergoes phase shift when it passes through those cells in the liquid crystal cell 104 that are in the driven state, and the light in an amount corresponding to the amount of this phase shift passes through and emerges from the polarizer 102B on the emergent side. It is therefore possible to display the desired image on the polarizer 102B side (i.e., on the emergent side by properly controlling the driving voltage that is applied to each cell in the liquid crystal cell 104. The liquid crystal display 100 is not limited to the above embodiment in which light is transmitted and blocked in the above-described manner, and there is also a liquid crystal display so constructed that light emerging from those cells in the liquid crystal cell 104 that are in the non-driven state passes through and emerges from the polarizer 102B on the emergent side, and that light emerging from those cells that are in the driven state is blocked by the polarizer 102B on the emergent side.

Discussion is now made on a case where linearly polarized light passes through the non-driven-state cells in the above-described liquid crystal cell 104 of VA mode. The liquid crystal cell 104 is birefringent, and its refractive index in the direction of thickness and that in the direction of plane are different from each other. Therefore, of the linearly polarized light that has passed through the polarizer 102A on the incident side, the light that has entered the liquid crystal cell 104 along its normal passes through the liquid crystal cell 104 without undergoing phase shift, but the light that has slantingly entered the liquid crystal cell 104 in the direction deviating from its normal undergoes phase shift while it passes through the liquid crystal cell 104, and becomes elliptically polarized light. The cause of this phenomenon is that those liquid crystalline molecules that are vertically aligned in the liquid crystal cell 104 when the cells in the liquid crystal cell 104 of VA mode are in the non-driven state function as a positive C plate. It is noted that the amount of phase shift that occurs for light passing through the liquid crystal cell 104 (transmitted light) is affected also by the birefringence of the liquid crystalline molecules sealed in the liquid crystal cell 104, the thickness of the liquid crystal cell 104, the wavelength of the transmitted light, and so on.

Owing to the above-described phenomenon, even when the cells in the liquid crystal cell 104 are in the non-driven state and linearly polarized light is supposed to be transmitted through the liquid crystal cell 104 as it is and blocked by the polarizer 102B on the emergent side, a part of the light that emerges slantingly from the liquid crystal cell 104 in the direction deviating from its normal is to leak from the polarizer 102B on the emergent side.

For this reason, the above-described conventional liquid crystal display 100 has the problem (so-called viewing angle dependency problem) that the display quality at the time when an image is viewed slantingly from a position not on the normal of the liquid crystal cell 104 is lower than that at the time when the image is viewed from the front of the display.

To eliminate the viewing angle dependency problem of the aforementioned conventional liquid crystal display 100, there have been developed a variety of techniques up to now. One of them is the liquid crystal display described, for example, in Patent Document 1 (Japanese Laid-Open Patent Publication No. 67219/1991). This liquid crystal display uses a retardation optical element including a retardation layer having a cholesteric-regular molecular structure (a retardation layer having double refractivity), where the retardation optical element is placed between a liquid crystal cell and a polarizer in order to provide optical compensation.

In the retardation optical element having a cholesteric-regular molecular structure, the selective reflection wavelength given by the equation λ=nav·p (p: the helical pitch in the helical structure consisting of liquid crystalline molecules, nav: the mean refractive index of a plane perpendicular to the helical axis), is so adjusted that it is either shorter or longer than the wavelength of transmitted light, as described in Patent Document 2 (Japanese Laid-Open Patent Publication No. 322223/1992), for example.

In the aforementioned retardation optical element, linearly polarized light that has slantingly entered the retardation layer in the direction deviating from its normal undergoes phase shift, while passing through the retardation layer, to become elliptically polarized light, like in the case of the above-described liquid crystal cell. The cause of this phenomenon is that the cholesteric-regular molecular structure functions as a negative C plate. The amount of phase shift that occurs for light passing through the retardation layer (transmitted light) is affected also by the birefringence of the liquid crystalline molecules in the retardation layer, the thickness of the retardation layer, the wavelength of the transmitted light, and so on.

Therefore, the viewing angle dependency problem of conventional liquid crystal displays can successfully be solved by the use of the above-described retardation optical element if the retardation layer contained in the retardation optical element is properly designed so that the phase shift that occurs in a liquid crystal cell of VA mode, which functions as a positive C plate, and the phase shift that occurs in the retardation layer contained in the retardation optical element, which functions as a negative C plate, are canceled each other.

However, it has been found that the viewing angle dependency problem can be solved if the above-described retardation optical element (a retardation layer having a cholesteric-regular molecular structure) is placed between a liquid crystal cell and a polarizer, but that, when the retardation optical element is so provided, bright and dark fringes could appear on a displayed image to drastically lower the display quality.

The inventor has made earnest studies to find the causes of this phenomenon by conducting experiments and computer-aided simulations, and, as a result, finally found that one of the causes is the directions of the directors of liquid crystalline molecules on the surfaces of the retardation layer contained in the retardation optical element.

SUMMARY OF THE INVENTION

The present invention has been accomplished in the light of the aforementioned drawbacks in the related art. An object of the present invention is to provide: a retardation optical element that produces no bright and dark fringes on a displayed image even when it is placed between a liquid crystal cell and a polarizer and can thus effectively prevent lowering of display quality; a method of producing such a retardation optical element; and a polarization element and a liquid crystal display, each including the retardation optical element.

A retardation optical element according to the first feature of the present invention comprises a retardation layer having a cholesteric-regular molecular structure with liquid crystalline molecules in planar orientation, the helical pitch in the molecular structure being so adjusted that the wavelength of light selectively reflected by the retardation layer due to its molecular structure falls in a range different from the wave range of incident light, wherein the directions of the directors of the liquid crystalline molecules on one surface of the two opposite main surfaces of the retardation layer are substantially the same, and those of the directors of the liquid crystalline molecules on the other surface of the retardation layer are also substantially the same.

According to the first feature of the present invention, in the retardation layer having a cholesteric-regular molecular structure with liquid crystalline molecules in planar orientation, the helical pitch in the molecular structure is so adjusted that the wavelength of light selectively reflected by the retardation layer due to its molecular structure falls in a range different from the wave range of incident light, and the directions of the directors of the liquid crystalline molecules on each of the two main surfaces of the retardation layer are made substantially the same. Therefore, even when the retardation optical element is placed between a liquid crystal cell and a polarizer, it does not produce bright and dark fringes on a displayed image and can thus effectively prevent lowering of display quality.

In the retardation optical element according to the first feature of the present invention, the dispersion in the directions of the directors of the liquid crystalline molecules on each one of the one surface and the other surface of the retardation layer is within ±10°, preferably within ±5°, more preferably within ±1°. As long as the dispersion falls in the above range, the appearance of bright and dark fringes is prevented more effectively, and the lowering of display quality can thus be prevented more surely.

In the retardation optical element according to the first feature of the present invention, it is preferable that the directions of the directors of the liquid crystalline molecules on the one surface of the retardation layer be substantially parallel with those of the directors of the liquid crystalline molecules on the other surface of the retardation layer. If the directions of the directors of the liquid crystalline molecules are so made, the appearance of bright and dark fringes is more effectively prevented, and the lowering of display quality can thus be more surely prevented.

In the above case, it is preferable that the angle made by the directions (mean direction) of the directors of the liquid crystalline molecules on the one surface of the retardation layer and the directions (mean direction) of the directors of the liquid crystalline molecules on the other surface of the retardation layer be within ±10°, preferably within ±5°, more preferably within ±1°. As long as the angle made by the two mean directions falls in the above range, the appearance of bright and dark fringes is prevented more effectively, and the lowering of display quality can thus be prevented more surely.

Further, in the retardation optical element according to the first feature of the present invention, it is preferable that the retardation layer has a helical structure with a pitch number of substantially (0.5×integer) between the directions of the directors of the liquid crystalline molecules on the one surface of the retardation layer and those of the directors of the liquid crystalline molecules on the other surface of the retardation layer. If the retardation layer has such a helical structure, even when the retardation optical element is placed between a liquid crystal cell and a polarizer, no bright and dark fringes appear on a displayed image, and the lowering of display quality can thus be effectively prevented.

In the above case, it is preferable that the angle made by the directions of the directors of the liquid crystalline molecules on the one surface of the retardation layer and those of the directors of the liquid crystalline molecules on the other surface of the retardation layer be within ±10°, preferably within ±5°, more preferably within ±1°. As long as this angle falls in the above range, the appearance of bright and dark fringes is prevented more effectively, and the lowering of display quality can thus be prevented more surely. The helical pitch or pitch number in the helical structure of the retardation layer may vary depending upon position in the plane extending in parallel with the one surface and the other surface of the retardation layer.

Further, in the retardation optical element according to the first feature of the present invention, it is preferable that the retardation layer be composed of successively, directly laminated multiple layers, each having a cholesteric-regular molecular structure with liquid crystalline molecules in planar orientation, and that the directions of the directors of the liquid crystalline molecules on the two adjacent surfaces of each two neighboring layers among the multiple layers be substantially parallel with each other.

Furthermore, in the retardation optical element according to the first feature of the present invention, it is preferable that the retardation layer has a molecular structure in which chiral nematic liquid crystalline molecules are three-dimensionally crosslinked. By so making the retardation layer, it is possible to thermally stably retain the cholesteric-regular molecular structure.

A method of producing a retardation optical element according to the second feature of the present invention comprises the steps of: applying a first liquid crystal comprising at least one type of polymerizable monomer or oligomer molecules having cholesteric regularity to an alignment layer that has been so formed that the surface thereof exerts alignment regulation power in substantially one direction, thereby aligning the first liquid crystal by the alignment regulation power of the surface of the alignment layer; and three-dimensionally crosslinking and solidifying the aligned first liquid crystal, thereby forming a first retardation layer that selectively reflects light whose wavelength falls in a range different from the wave range of incident light.

According to the second feature of the present invention, it is possible to obtain a retardation optical element that does not produce bright and dark fringes on a displayed image and can effectively prevent lowering of display quality.

In the method of producing a retardation optical element according to the second feature of the present invention, it is preferable that the thickness of the first liquid crystal that is applied to the surface of the alignment layer be so adjusted that the directions of the directors of the liquid crystalline molecules on the surface of the two opposite main surfaces of the first retardation layer, which surface is not controlled by the alignment regulation power of the surface of the alignment layer, are regulated. If the thickness of the first retardation layer is so adjusted, the appearance of bright and dark fringes is more effectively prevented, and the lowering of display quality can thus be prevented more surely.

Further, in the method of producing a retardation optical element according to the second feature of the present invention, it is preferable that another alignment layer be brought into contact with the surface of the first liquid crystal applied to the surface of the alignment layer, the contacting surface being on the side apart from the alignment layer, in order to regulate the directions of the directors of the liquid crystalline molecules on the surface of the two opposite main surfaces of the retardation layer, which surface is not controlled by the alignment regulation power of the surface of the alignment layer. If another alignment layer is so provided, the appearance of bright and dark fringes is more effectively prevented, and the lowering of display quality can thus be prevented more surely.

Preferably, the method of producing a retardation optical element according to the second feature of the present invention further comprises the steps of: directly applying, to the first retardation layer, a second liquid crystal comprising at least one type of other polymerizable monomer or oligomer molecules having cholesteric regularity, thereby aligning the second liquid crystal by the alignment regulation power of the surface of the first retardation layer; and three-dimensionally crosslinking and solidifying the aligned second liquid crystal, thereby forming a second retardation layer that selectively reflects light whose wavelength falls in a range different from the wave range of incident light. If the method further comprises these steps, a retardation optical element composed of multiple retardation layers laminated, capable of preventing the appearance of bright and dark fringes on a displayed image and of effectively preventing lowering of display quality can simply be obtained without separately providing an alignment layer between the first and second retardation layers.

In the method of producing a retardation optical element according to the second feature of the present invention, it is preferable that, in at least one of the the step of forming the first retardation layer and that of forming the second retardation layer, the thickness of the first or second liquid crystal that is applied to the surface of the alignment layer or of the first retardation layer be so adjusted that the directions of the directors of the liquid crystalline molecules on the surface of the two opposite main surfaces of the first or second retardation layer, which surface is not controlled by the alignment regulation power of the surface of the alignment layer or of the first retardation layer, are regulated. By so adjusting the thickness, it is possible to prevent appearance of bright and dark fringes more effectively and thus to prevent lowering of display quality more surely.

In the method of producing a retardation optical element according to the second feature of the present invention, it is preferable that, in at least one of the step of forming the first retardation layer and that of forming the second retardation layer, another alignment layer be brought into contact with the surface of the first or second liquid crystal applied to the surface of the alignment layer or of the first retardation layer, the surface being on the side apart from the surface of the alignment layer or of the first retardation layer, in order to regulate the directions of the directors of the liquid crystalline molecules on the surface of the two opposite main surfaces of the first or second retardation layer, which surface is not controlled by the alignment regulation power of the surface of the alignment layer or of the first retardation layer. If another alignment layer is so provided, the appearance of bright and dark fringes is prevented more effectively, and the lowering of display quality can thus be prevented more surely.

Further, in the method of producing a retardation optical element according to the second feature of the present invention, it is preferable that both of the first and second liquid crystals that are applied to form the first and second retardation layers, respectively, have selective reflection wave ranges that are either shorter or longer than the wave range of incident light. If the first and second liquid crystals have such selective reflection wave ranges, material transfer does not occur between the first and second retardation layers made from the first and second liquid crystals, respectively. It is therefore possible to produce a retardation optical element as a more uniform laminate of retardation layers and to more effectively control the optical activity caused by the cholesteric-regular molecular structure.

Furthermore, in the method of producing a retardation optical element according to the second feature of the present invention, it is preferable that the first and second liquid crystals that are applied to form the first and second retardation layers, respectively, comprise substantially the same material. If so, material transfer scarcely occurs between the first and second retardation layers made from the first and second liquid crystals, respectively, so that it is possible to produce a retardation optical element as a more uniform laminate of retardation layers.

A method of producing a retardation optical element according to the third feature of the present invention comprises the steps of: applying a first liquid crystal comprising a liquid crystalline polymer having cholesteric regularity to an alignment layer that has been so formed that the surface thereof exerts alignment regulation power in substantially one direction, thereby aligning the first liquid crystal by the alignment regulation power of the surface of the alignment layer; and solidifying the aligned first liquid crystal into a glassy state by cooling, thereby forming a first retardation layer that selectively reflects light whose wavelength falls in a range different from the wave range of incident light.

According to the third feature of the present invention, it is possible to obtain a retardation optical element that produces no bright and dark fringes on a displayed image and can effectively prevent lowering of display quality.

In the method of producing a retardation optical element according to the third feature of the present invention, it is preferable that the thickness of the first liquid crystal that is applied to the surface of the alignment layer be so adjusted that the directions of the directors of the liquid crystalline molecules on the surface of the two opposite main surfaces of the first retardation layer, which surface is not controlled by the alignment regulation power of the surface of the alignment layer, are regulated. If the thickness of the first liquid crystal is so adjusted, the appearance of bright and dark fringes is prevented more effectively, and the lowering of display quality can thus be prevented more surely.

Further, in the method of producing a retardation optical element according to the third feature of the present invention, it is preferable that another alignment layer be brought into contact with the surface of the first liquid crystal applied to the surface of the alignment layer, the contacting surface being on the side apart from the surface of the alignment layer, in order to regulate the directions. of the directors of the liquid crystalline molecules on the surface of the two opposite main surfaces of the first retardation layer, which surface is not controlled by the alignment regulation power of the surface of the alignment layer. If another alignment layer is so provided, the appearance of bright and dark fringes is prevented more effectively, and the lowering of display quality can thus be prevented more surely.

Furthermore, the method of producing a retardation optical element according to the third feature of the present invention further comprises the steps of: directly applying, to the first retardation layer, a second liquid crystal comprising another liquid crystalline polymer having cholesteric regularity, thereby aligning the second liquid crystal by the alignment regulation power of the surface of the first retardation layer; and solidifying the aligned second liquid crystal into a the glassy state by cooling, thereby forming a second retardation layer that selectively reflects light whose wavelength falls in a range different from the wave range of incident light. If the method further comprises these steps, a retardation optical element composed of multiple retardation layers laminated, capable of preventing appearance of bright and dark fringes on a displayed image and of effectively preventing lowering of display quality, can simply be obtained without separately providing an alignment layer between the first and second retardation layers.

In the method of producing a retardation optical element according to the third feature of the present invention, it is preferable that, in at least one of the step of forming the first retardation layer and that of forming the second retardation layer, the thickness of the first or second liquid crystal that is applied to the surface of the alignment layer or of the first retardation layer be so adjusted that the directions of the directors of the liquid crystalline molecules on the surface of the two opposite main surfaces of the first or second retardation layer, which surface is not controlled by the alignment regulation power of the surface of the alignment layer or of the first retardation layer, are regulated. By so adjusting the thickness of the first or second liquid crystal, it is possible to prevent appearance of bright and dark fringes more effectively and thus to prevent lowering of display quality more surely.

Further, in the method of producing a retardation optical element according to the third feature of the present invention, it is preferable that, in at least one of the step of forming the first retardation layer and that of forming the second retardation layer, another alignment layer be brought into contact with the surface of the first or second liquid crystal applied to the surface of the alignment layer or of the first retardation layer, the contacting surface being on the side apart from the surface of the alignment layer or of the first retardation layer, in order to regulate the directions of the directors of the liquid crystalline molecules on the surface of the two opposite main surfaces of the first or second retardation layer, which surface is not controlled by the alignment regulation power of the surface of the alignment layer or of the first retardation layer. If another alignment layer is so provided, the appearance of bright and dark fringes is prevented more effectively, and the lowering of display quality can thus be prevented more surely.

Further, in the method of producing a retardation optical element according to the third feature of the present invention, it is preferable that both of the first and second liquid crystals that are applied to form the first and second retardation layers, respectively, have selective reflection wave ranges that are either shorter or longer than the wave range of incident light. If the first and the second liquid crystals have such selective reflection wave ranges, material transfer does not occur between the first and second retardation layers made from the first and second liquid crystals, respectively. It is therefore possible to produce a retardation optical element as a more uniform laminate of retardation layers and to more effectively control the optical activity caused by the cholesteric-regular molecular structure.

Furthermore, in the method of producing a retardation optical element according to the third feature of the present invention, it is preferable that the first and second liquid crystals that are applied to form the first and second retardation layers, respectively, comprise substantially the same material. If so, material transfer scarcely occurs between the first and second retardation layers made from the first and second liquid crystals, respectively, so that it is possible to produce a retardation optical element as a more uniform laminate of retardation layers.

A polarization element according to the fourth feature of the present invention comprises: a polarizing layer; and a retardation optical element according to the above-described first feature of the present invention, provided on the surface of the polarizing layer.

According to the fourth feature of the present invention, a polarizing layer is applied to at least one surface of the retardation optical element by lamination or the like, so that the reflection of light on the surface of the retardation optical element is drastically decreased. It is therefore possible to effectively prevent appearance of bright and dark fringes and to improve contrast. The lowering of display quality can thus be effectively prevented.

In the polarization element according to the fourth feature of the present invention, it is preferable that the directions of the directors of the liquid crystalline molecules on the one surface or the other surface of the retardation optical element be substantially parallel with or perpendicular to the axis of absorption of the polarizing layer. By so controlling the directions of the directors of the liquid crystalline molecules, it is possible to more effectively prevent appearance of bright and dark fringes and to improve contrast. The lowering of display quality can thus be prevented more surely.

A liquid crystal display according to the fifth feature of the present invention comprises: a liquid crystal cell; a pair of polarizers so arranged that the liquid crystal cell is sandwiched therebetween; and a retardation optical element according to the above-described first feature of the present invention, placed between the liquid crystal cell and at least one of the paired polarizers, wherein, of the light in a predetermined state of polarization, emerging from the liquid crystal cell, a part of the light that emerges slantingly in the direction deviating from the normal of the liquid crystal cell is compensated by the retardation optical element for the state of polarization.

According to the fifth feature of the present invention, the retardation optical element is arranged between the liquid crystal cell and the polarizer in the liquid crystal display so that, of the light emerging from the liquid crystal cell, a part of the light that emerges slantingly in the direction deviating from the normal of the liquid crystal cell is compensated by the retardation optical element for the state of polarization. It is therefore possible to prevent appearance of bright and dark fringes on the liquid crystal display and to improve contrast. The lowering of display quality can thus be prevented.

In the liquid crystal display according to the fifth feature of the present invention, it is preferable that the directions of the directors of the liquid crystalline molecules on the one surface or the other surface of the retardation optical element be substantially parallel with or perpendicular to the axis of absorption of each one of the polarizers. By so controlling the directions of the directors of the liquid crystalline molecules, it is possible to more effectively prevent appearance of bright and dark fringes on the liquid crystal display and to improve contrast. The lowering of display quality can thus be prevented more surely.

BRIEF DESCRIPTION OF THE DRAWINGS

In the drawings,

FIG. 10 is a diagrammatic exploded perspective view of a polarization element including a retardation optical element according to an embodiment of the present invention;

FIG. 11 is a diagrammatic exploded perspective view of a liquid crystal display including a retardation optical element according to an embodiment of the present invention;

DETAILED DESCRIPTION OF PREFERRED EMBODIMENTS

By referring to the accompanying drawings, embodiments of the present invention will be described hereinafter.

A retardation optical element according to this embodiment is firstly described with reference to FIG. 1.

Figure 1:
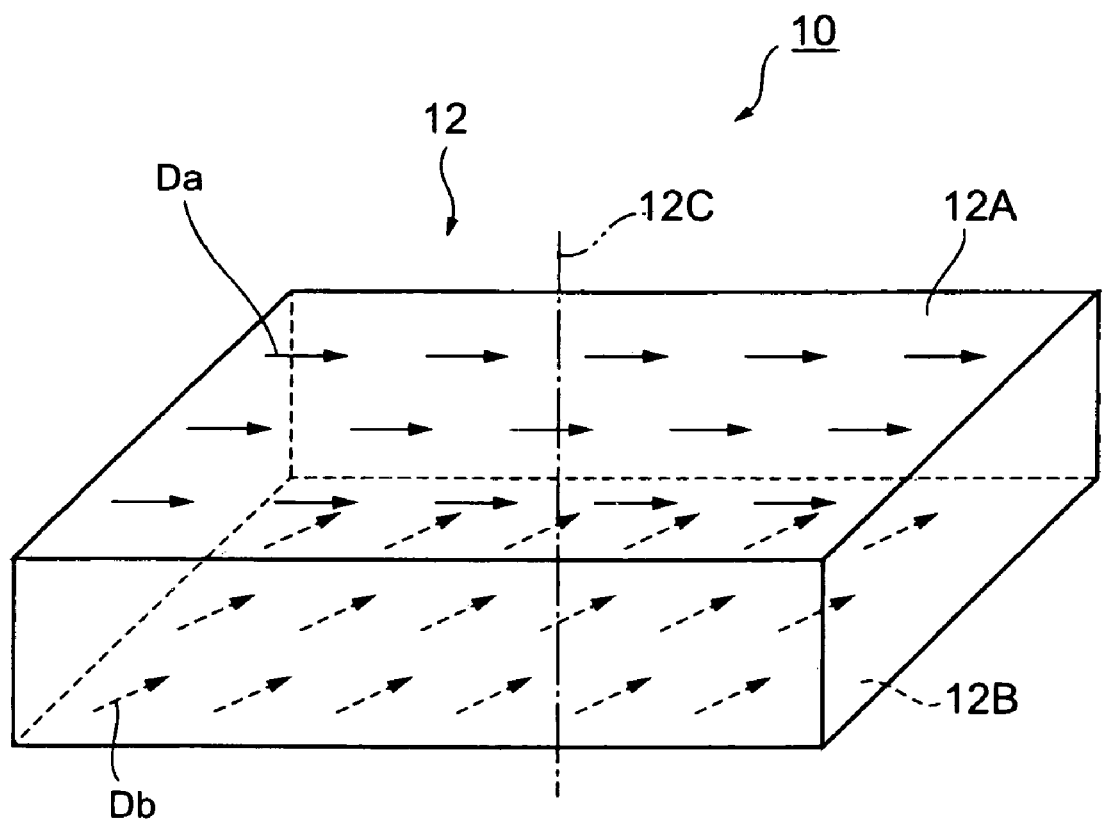
FIG. 1 is an enlarged perspective view diagrammatically showing a part of a retardation optical element according to an embodiment of the present invention.

As shown in FIG. 1, this retardation optical element 10 includes a retardation layer 12 having a cholesteric-regular molecular structure (helical structure) with liquid crystalline molecules in planar orientation.

The retardation layer 12 with a cholesteric-regular molecular structure has a rotated-light-selecting property (polarized-light-separating property) of separating a component optically rotated (circularly polarized) in one direction from a component optically rotated in the opposite direction according to the physical orientation of the liquid crystalline molecules (planar orientation). This phenomenon is known as "circular dichroism." If the direction of rotation of the liquid crystalline molecules constituting the helical structure is properly selected, the component circularly polarized in the same direction as this direction of rotation is selectively reflected.

In this case, the scattering of polarized light becomes maximum (the selective reflection is peaked) at the wavelength λ0 given by the following equation (1):

$$\lambda_0 = n_{av} \cdot p, \tag{1}$$

wherein p is the helical pitch in the helical structure consisting of liquid crystalline molecules, and $n_{av}$ is the mean refractive index of a plane perpendicular to the helical axis.

On the other hand, the width Δλ of the wave range in which the wavelength of selectively reflected light falls is given by the following equation (2):

$$\Delta\lambda = \Delta n \cdot p, \tag{2}$$

wherein Δn is the birefringence, which is a difference between the index of refraction for ordinary light and that of refraction for extraordinary light.

Namely, with respect to non-polarized light incident on the retardation layer 12 having such a cholesteric-regular molecular structure, either right-handed or left-handed circularly polarized component of light in a selective reflection wave range with a central wavelength λ0 and a width Δλ is reflected owing to the above-described polarized-light-separating property, and the other circularly polarized component of the light and light (non-polarized light) not in this selective reflection wave range are transmitted. It is noted that the right-handed or left-handed circularly polarized component is reflected without undergoing reversion of the direction of rotation unlike in the case of ordinary reflection of light.

The helical pitch in the molecular structure of the retardation layer 12 is herein so adjusted that the retardation layer 12 selectively reflects, owing to its molecule structure, light whose wavelength falls in a range that is different from the wave range of light incident on the retardation layer 12 (a selective reflection wave range that is shorter or longer than the wave range of the incident light).

The purpose of making the selective reflection wave range of the retardation layer 12 either shorter or longer than the wave range of the incident light is to prevent selective reflection of the incident light that can occur owing to the cholesteric-regular molecular structure. Therefore, in the case where the light incident on the retardation layer 12 is visible light (wave range: 380–780 nm), the wavelength of the light selectively reflected by the retardation layer 12 owing to its cholesteric-regular molecular structure is preferably 380 nm or less or 780 nm or more. As long as the wavelength of the selectively reflected light falls in this range, it is possible to avoid the coloring problem and the like that are brought about by the reflection of visible light, while letting the retardation layer 12 function as a negative C plate. That the wave range of the selectively reflected light is shorter than the wave range of the incident light is more preferred because, in this case, the optical activity is smaller.

Further, the retardation layer 12 has two opposite main surfaces (surfaces with larger areas) 12A and 12B that are perpendicular to each other in the direction of thickness, as shown in FIG. 1.

The directions of the directors Da of the liquid crystalline molecules on the entire area of the surface 12A, one of the two main surfaces 12A and 12B, are substantially the same, and, at the same time, the directions of the directors Db of the liquid crystalline molecules on the entire area of the other surface 12B are also substantially the same. The dispersion in the directions of the directors of the liquid crystalline molecules on each of the one surface 12A and the other surface 12B of the retardation layer 12 is within ±10°, preferably within ±5°, more preferably ±1°.

The expression "substantially the same" as used herein encompasses the case where the directions of the directors of the liquid crystalline molecules are different by an angle of approximately 180°, that is, the head of a liquid crystalline molecule and the tail of another one are in the same direction. This is because, in many cases, the head of a liquid crystalline molecule is optically indistinguishable from its tail. The same is true for the case that will be described later (the case where the directions of the directors Da and Db of the liquid crystalline molecules on the surfaces 12A and 12B of the retardation layer 12 are substantially parallel with each other).

Whether the directions of the directors Da and Db of the liquid crystalline molecules on the surfaces 12A and 12B are substantially the same or not can be known by observing the cross section of the retardation layer 12 by a transmission electron microscope. Specifically, when the cross section of the retardation layer 12 that has been solidified with its cholesteric-regular molecular structure maintained is observed by a transmission electron microscope, bright and dark fringes are observed correspondingly to the pitches of the molecular helixes characteristic of the cholesteric-regular molecular structure. Therefore, if the bright and dark fringes that appear on each surface 12A and 12B are seen almost the same in terms of concentration, it can be judged that the directions of the directors of the liquid crystalline molecules on this surface are substantially the same.

The term "liquid crystalline molecules" is usually used to indicate those molecules that have both the fluidity of liquid and the anisotropy of crystal. However, in this specification, this term "liquid crystalline molecules" is also used, for convenience' sake, to indicate those molecules that have been solidified while retaining anisotropy which the molecules possessed when they are in the fluid state. Examples of methods of solidifying molecules while retaining anisotropy which the molecules possessed when they are in the fluid state include the method in which liquid crystalline molecules having polymerizable groups (polymerizable monomer or oligomer molecules) are crosslinked, and the method in which a high-molecular-weight liquid crystal (liquid crystalline polymer) is cooled to a temperature below its glass transition temperature.

The retardation layer 12 having the above-described cholesteric-regular molecular structure has anisotropy, that is, double refractivity, and its refractive index in the direction of thickness is different from that in the direction of plane. The retardation layer 12 therefore functions as a negative C plate.

Namely, in the three-dimensional rectangular coordinates, when Nx and Ny represent the refractive indexes of the retardation layer 12 in the direction of plane, and Nz, that of the retardation layer 12 in the direction of thickness, these Nx, Ny and Nz are in the relationship Nz<Nx=Ny. For this reason, although linearly polarized light that enters the retardation layer 12 along its normal 12C is transmitted without undergoing phase shift, linearly polarized light that slantingly enters the retardation layer 12 in the direction deviating from the normal 12C undergoes phase shift to become elliptically polarized light. It is also possible, on the contrary, to convert elliptically polarized light that slantingly enters the retardation layer 12 in the direction deviating from the normal 12C into linearly polarized light.

In the retardation layer 12 included in the retardation optical element 10 according to the above-described embodiment, the directions of the directors Da and Db of the liquid crystalline molecules on the entire areas of the main surfaces 12A and 12B are substantially the same, respectively. However, in the case where the retardation layer 12 are divided into multiple sections, it is enough to make the directions of the directors Da and Db of the liquid crystalline molecules in each section of the main surfaces 12A and 12B substantially the same, respectively.

Next, a modification of the retardation optical element according to this embodiment will be described with reference to FIG. 2.

Figure 2:
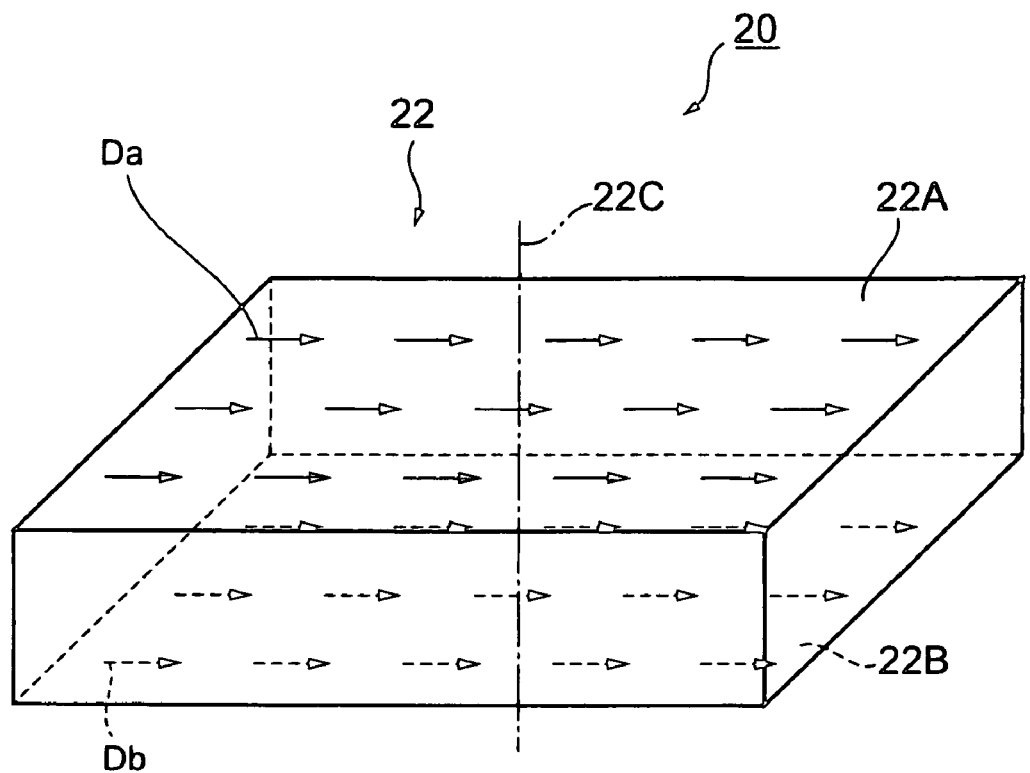
FIG. 2 is an enlarged perspective view diagrammatically showing a part of a modification of the retardation optical element according to an embodiment of the present invention.

As shown in FIG. 2, this retardation optical element 20 includes a retardation layer 22 having a cholesteric-regular molecular structure (helical structure) with liquid crystalline molecules in planar orientation.

The retardation layer 22 has two opposite main surfaces (surfaces with larger areas) 22A and 22B that are perpendicular to each other in the direction of thickness, as shown in FIG. 2.

The directions of the directors Da of the liquid crystalline molecules on the entire area of the surface 22A, one of the two main surfaces 22A and 22B, are substantially the same, and, at the same time, the directions of the directors Db of the liquid crystalline molecules on the entire area of the other surface 22B are also substantially the same. The dispersion in the directions of the directors of the liquid crystalline molecules on each of the one surface 22A and the other surface 22B of the retardation layer 22 is within ±10°, preferably within ±5°, more preferably ±1°.

Further, it is preferable that the directions of the directors Da of the liquid crystalline molecules on the one surface 22A of the retardation layer 22 be substantially parallel with those of the directors Db of the liquid crystalline molecules on the other surface 22B of the retardation layer 22. The angle made by the directions (mean direction) of the directors of the liquid crystalline molecules on the one surface 22A of the retardation layer 22 and the directions (mean direction) of the directors of the liquid crystalline molecules on the other surface 22B of the retardation layer 22 is within ±10°, preferably within ±5°, more preferably ±1°.

The other details about the construction of the retardation layer 22 in the retardation optical element 20 are basically the same as those about the construction of the aforementioned retardation layer 12 in the retardation optical element 10, so that detailed descriptions for them are herein omitted.

Figure 3A:
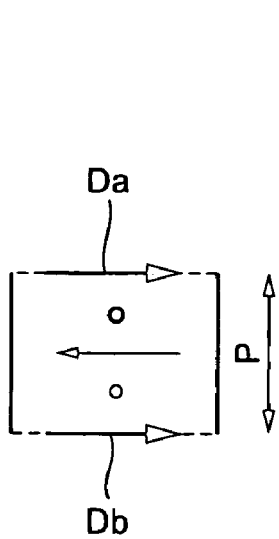
FIGS. 3A, 3B and 3C are diagrammatic views showing the relationship between the helical pitch in the helical structure consisting of liquid crystalline molecules, having cholesteric regularity, and the directors of the liquid crystalline molecules on the surfaces of a retardation layer.
Figure 3B:
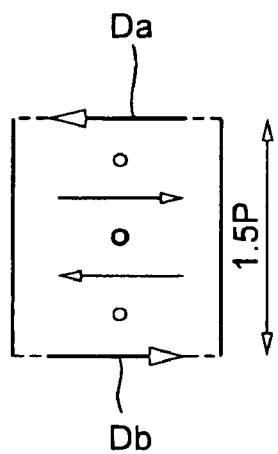
Figure 3C:
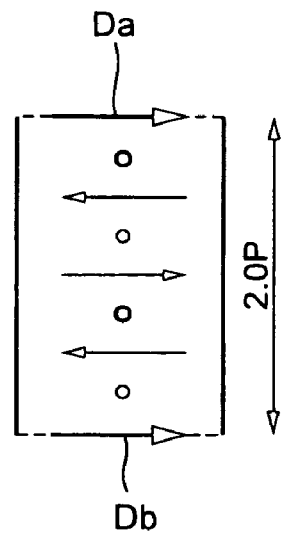

In the retardation optical element 20, it is preferable to make the thickness of the retardation layer 22 equal to (0.5×integer) times the helical pitch p in the helical structure consisting of liquid crystalline molecules, in order to make the directions of the directors Da and Db of the liquid crystalline molecules on the two opposite surfaces 22A and 22B agree with each other with high accuracy. If the thickness of the retardation layer 22 is so made, it can optically be divided, without a remainder, by a half of the helical pitch p in the helical structure consisting of liquid crystalline molecules, as diagrammatically shown in FIGS. 3A, 3B and 3C, for example. There can thus be avoided optical deviation from the above equation (1), which is a simplified theoretical equation, especially disturbance of the state of polarization that is caused by phase shift that occurs for the light entering along the helical axis.

Also in the above case, the angle made by the directions of the directors Da of the liquid crystalline molecules on the one surface 22A of the retardation layer 22 and those of the directors Db of the liquid crystalline molecules on the other surface 22B of the retardation layer 22 is within ±10°, preferably within ±5°, more preferably ±1°.

In the retardation layer 22 included in the retardation optical element 20 according to the above-described embodiment, the directions of the directors Da and Db of the liquid crystalline molecules on the entire areas of the main surfaces 22A and 22B are substantially the same, respectively, and, at the same time, the directions of the directors Da of the liquid crystalline molecules on the one surface 22A are substantially parallel with those of the directors Db of the liquid crystalline molecules on the other surface 22B. However, in the case where the retardation layer 22 is divided into multiple sections, it is enough to make the directions of the directors Da and Db of the liquid crystalline molecules in each section of the main surfaces 22A and 22B substantially the same, respectively, and to make the directions of the directors Da of the liquid crystalline molecules in each section of the one surface 22A substantially parallel with those of the directors Db of the liquid crystalline molecules on the corresponding section of the other surface 22B.

Useful as materials for the retardation layers 12 and 22 in the retardation optical elements 10 and 20 are three-dimensionally crosslinkable liquid crystalline monomers or oligomers (polymerizable monomer or oligomer molecules), as well as high-molecular-weight liquid crystals (liquid crystalline polymers) that can be solidified into a glassy state by cooling.

In the case where the retardation layers 12 and 22 are made from three-dimensionally crosslinkable, polymerizable monomer molecules, it is possible to use mixtures of liquid crystalline monomers and chiral compounds as disclosed in Japanese Laid-Open Patent Publication No. 258638/1995 and Published Japanese Translation No. 508882/1998 of PCT International Publication for Patent Application. If three-dimensionally crosslinkable, polymerizable oligomers are used, it is desirable to use cyclic organopolysiloxane compounds and the like having cholesteric phases as disclosed in Japanese Laid-Open Patent Publication No. 165480/1982. By "three-dimensional crosslinking" is herein meant that polymerizable monomer or oligomer molecules are three-dimensionally polymerized to give a network structure. By making the molecules into such a state, it is possible to optically fix the liquid crystalline molecules while retaining its cholesteric liquid crystalline state and thus to obtain a film that is easy to handle as an optical film and stable at normal temperatures.

Taken herein as an example is the case where three-dimensionally crosslinkable, polymerizable monomer molecules are used. In this case, a chiral nematic liquid crystal (cholesteric liquid crystal) can be obtained by adding a chiral agent to a liquid crystalline monomer having nematic liquid crystal phase. More specifically, it is possible to use liquid crystalline monomers represented by the general formulae (1) to (11), for example. In liquid crystalline monomers represented by the general formula (11), X is preferably an integer of 2 to 5.

(Formulae (1) to (11))

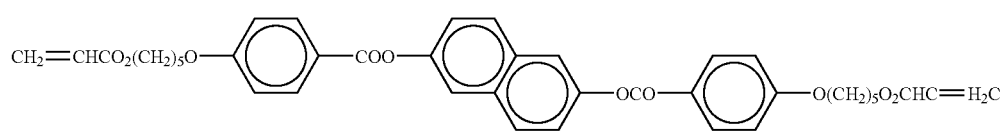

(1)

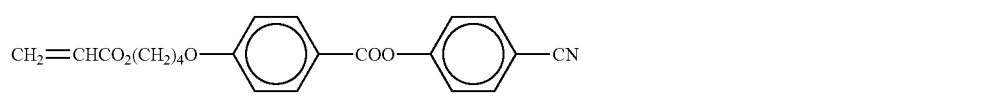

(2)

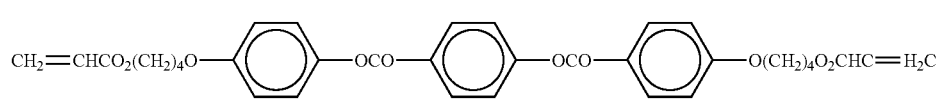

(3)

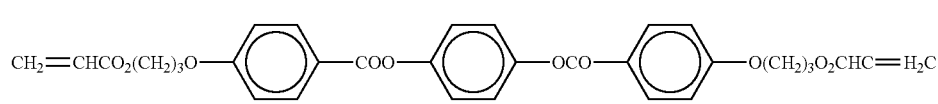

(4)

-continued

(5)

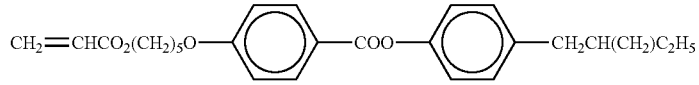
(6)

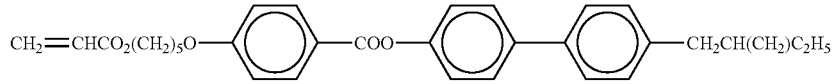
(7)

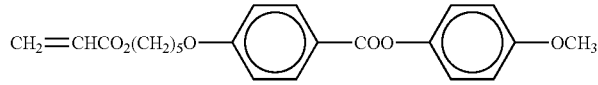
(8)

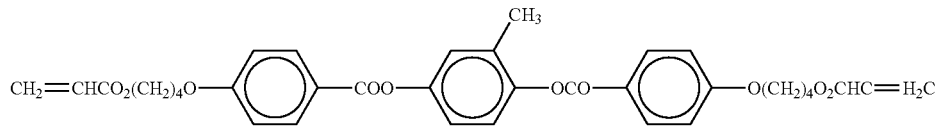
(9)

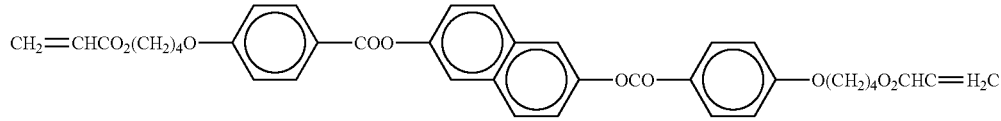
(10)

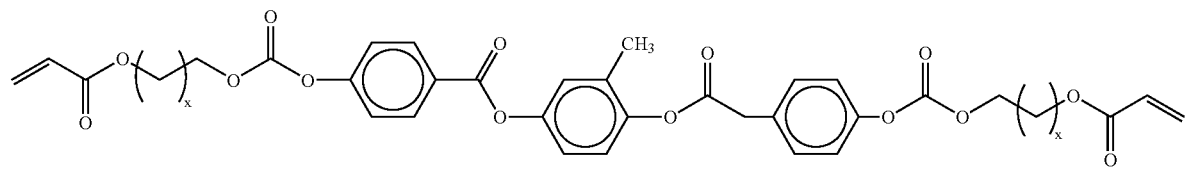
(11)

It is preferable to use, as the chiral agent, those compounds represented by the general formulae (12) to (14), for example. In chiral agents having the general formula (12) or (13), X is preferably an integer of 2 to 12. In chiral agents having the general formula (14), X is preferably an integer of 2 to 5. $R^4$ in the general formula (12) represents hydrogen or methyl group. (Formulae (12) to (14))

On the other hand, in the case where the retardation layers 12 and 22 are made from liquid crystalline polymers, there can be used: polymers containing mesogen groups, which make the polymers liquid crystalline, in their main or side chains, or in both their main and side chains; high-molecular-weight cholesteric liquid crystals having cholesteryl groups in their side chains; liquid crystalline polymers as

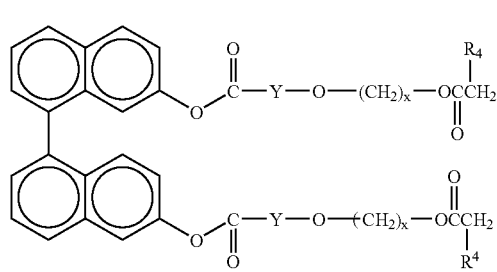
(12)

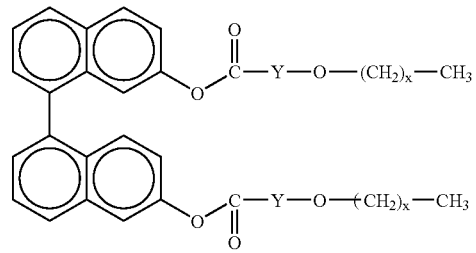
(13)

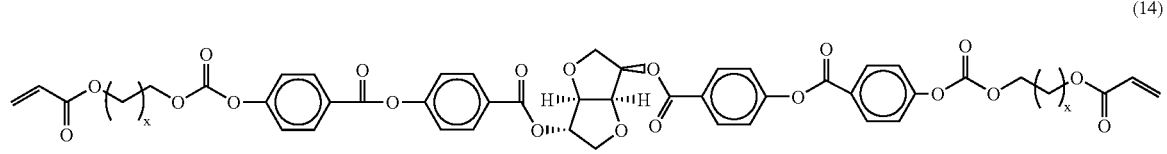
(14)

disclosed in Japanese Laid-Open Patent Publication No. 133810/1997, liquid crystalline polymers as disclosed in Japanese Laid-Open Patent Publication No. 293252/1999, and so forth.

Next, methods of producing the retardation optical elements 10 and 20 having the above constructions according to the aforementioned embodiments will be described hereinafter.

(First Production Method)

Firstly, a production method that is employed when polymerizable monomer or oligomer molecules are used as a material for a retardation layer will be described with reference to FIGS. 4(A) to 4(C).

Figure 4:
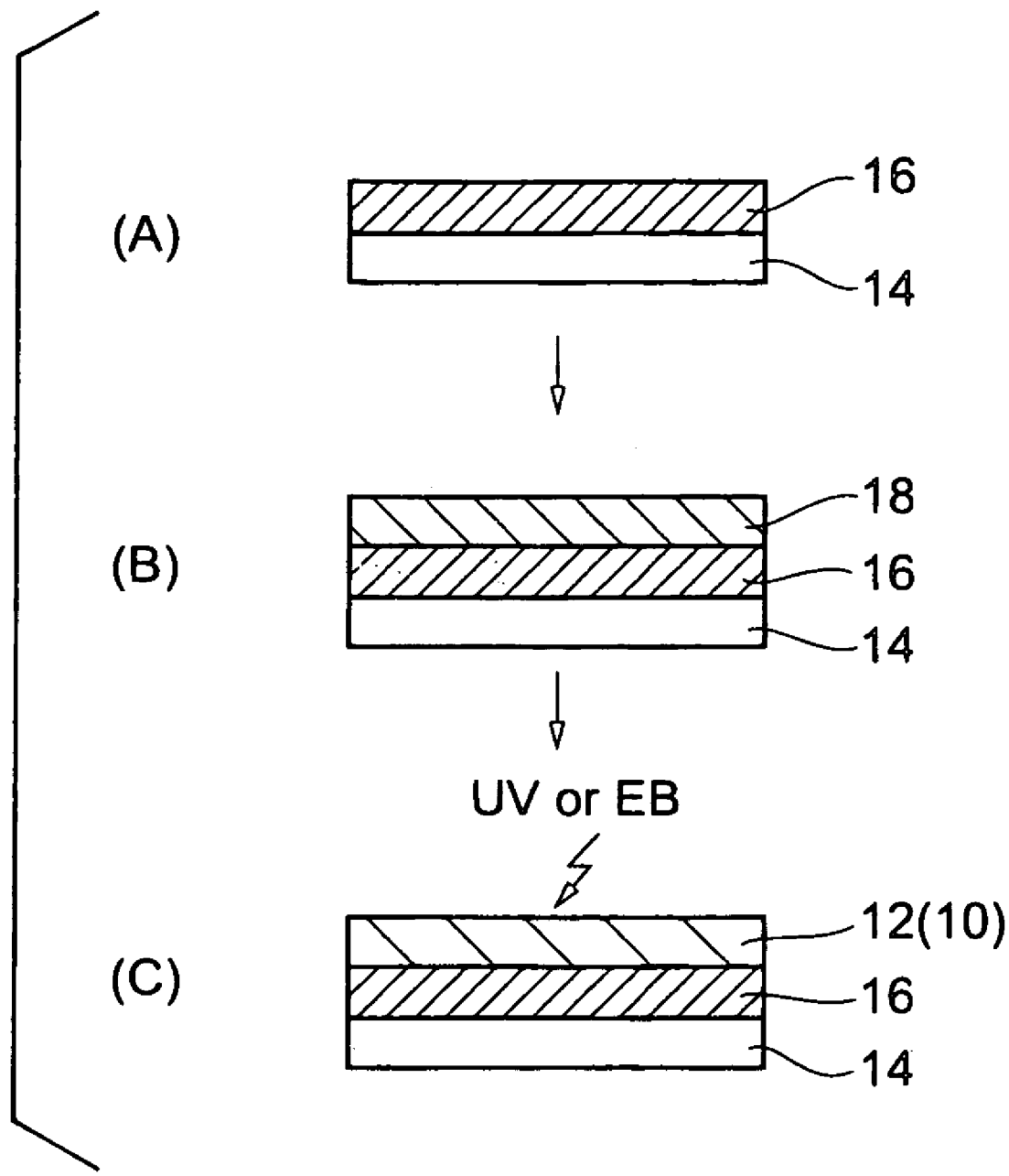
FIG. 4 is a diagrammatic cross-sectional view illustrating a first method of producing a retardation optical element according to an embodiment of the present invention.

In this production method, an alignment layer 16 is formed, in advance, on a glass substrate or a polymeric film 14 such as a TAC (cellulose triacetate) film, as shown in FIG. 4(A). To this alignment layer 16, polymerizable monomer molecules (or polymerizable oligomer molecules) 18 are applied as the liquid crystalline molecules, as shown in FIG. 4(B), and are aligned by the alignment regulation power of the alignment layer 16. At this time, the applied polymerizable monomer molecules (or polymerizable oligomer molecules) 18 form a liquid crystal layer.

Next, while retaining this state of alignment, polymerization of the polymerizable monomer molecules (or polymerizable oligomer molecules) 18 is initiated by the combination use of a photopolymerization initiator previously added and ultraviolet light externally applied, or is directly initiated by the application of an electron beam, as shown in FIG. 4(C), thereby three-dimensionally crosslinking (polymerizing) and solidifying the polymerizable monomer molecules (or polymerizable oligomer molecules) 18. Thus, there is obtained a retardation optical element 10 including the above-described single retardation layer 12, functioning as a negative C plate.

If the alignment layer 16 has been so formed that its entire surface exerts alignment regulation power in substantially one direction, the directions of the directors Da of the liquid crystalline molecules that are in contact with the alignment layer 16 become substantially the same over the contact face.

In this case, to make the directions of the directors Db of the liquid crystalline molecules on the surface 12B that is on the side apart from the alignment layer 16 substantially the same over the entire area of the surface 12B, as shown in FIG. 1, it is enough to make the thickness of the retardation layer 12 uniform. Further, in a series of the steps shown in FIGS. 4(A) to 4(C), the following step may be effected as shown in FIGS. 5(A) to 5(D) after applying the polymerizable monomer molecules (or polymerizable oligomer molecules) 18 to the alignment layer 16 and before three-dimensionally crosslinking these molecules: a second alignment layer 16A is superposed on the applied polymerizable monomer molecules (polymerizable oligomer molecules) 18 (FIG. 5(C)), and these molecules sandwiched between the alignment layer 16 and the second alignment layer 16A are three-dimensionally crosslinked by the application of ultraviolet light or an electron beam (FIG. 5(D)), like in the step shown in FIG. 4(C). The second alignment layer 16A may be separated from the retardation layer 12 after the application of ultraviolet light or an electron beam.

In order to decrease the viscosity of the polymerizable monomer molecules (or polymerizable oligomer molecules) 18 so that they can be applied with ease, they may be dissolved in a solvent to obtain a coating liquid. If such a coating liquid is used, it is necessary to effect the drying step of evaporating the solvent before the step of three-dimensionally crosslinking the polymerizable monomer molecules (or polymerizable oligomer molecules) 18 by the application of ultraviolet light or an electron beam. Preferably, after effecting the step of applying the coating liquid, the drying step is effected to evaporate the solvent, and the alignment step is then effected to align the liquid crystal.

Further, if the polymerizable monomer molecules (or polymerizable oligomer molecules) 18 are made into a liquid crystal layer at a predetermined temperature, the resulting liquid crystal layer is nematic. If any chiral agent is added to this nematic liquid crystal layer, a chiral nematic liquid crystalline phase (cholesteric liquid crystalline phase) is developed. Specifically, it is enough to add a chiral agent to the polymerizable monomer or oligomer molecules in an amount of several to 10%. By varying the chiral power by changing the type of the chiral agent to be added, or by changing the concentration of the chiral agent in the polymerizable monomer or oligomer molecules, it is possible to control the selective reflection wave range, which is determined by the molecular structure consisting of the polymerizable monomer or oligomer molecules.

The alignment layer 16 and/or the second alignment layer 16A can be formed by a conventionally known method. For example, the alignment layer may be formed by the method in which a PI (polyimide) or PVA (polyvinyl alcohol) film is formed on the above-described glass substrate or polymeric film 14 such as a TAC film and is then rubbed, or the method in which a polymeric compound film that can serve as an optical alignment layer is formed on a glass substrate or a polymeric film 14 such as a TAC film and is irradiated with polarized UV (ultraviolet light). Moreover, oriented PET (polyethylene terephthalate) films, etc. can also be used for the alignment layer 16 and/or the second alignment layer 16A.

In the case where a polymeric film such as a TAC film is used as a substrate on which the alignment layer 16 is formed, it is preferable to previously provide a barrier layer on the polymeric film so that the substrate is not damaged by a solvent in which the polymerizable monomer molecules (or polymerizable oligomer molecules) 18 are dissolved to obtain a coating liquid; the coating liquid is then applied to this barrier layer.

On the other hand, when the retardation optical element 20 as shown in FIG. 2 is produced, the thickness of the retardation layer 22 is made uniform and equal to (0.5× integer) times the helical pitch p in the helical structure consisting of the liquid crystalline molecules. In this case, it is possible to employ not only the method in which the thickness of the retardation layer 22 is adjusted, but also the method in which the above-described second alignment layer 16A is employed, where the direction in which the second alignment layer 16A exerts its alignment regulation power is made the same as the direction in which the alignment layer 16 exerts its alignment regulation power.

In the retardation optical elements 10 and 20 produced in the above-described manners, if the second alignment layer 16A is used in addition to the alignment layer 16 in order to make the directions of the directors Da and Db of the liquid crystalline molecules on the surfaces 12A, 12B, 22A and 22B of the retardation layers 12 and 22 substantially the same over the entire areas of the surfaces 12A, 12B, 22A and 22B, respectively, the first alignment layer 16 and the second alignment layer 16A regulate the directions of the directors Da and Db of the liquid crystalline molecules on the surfaces 12A, 12B, 22A and 22B of the retardation layers 12 and 22, respectively. Therefore, it is not necessary that the thickness of the retardation layers 12 and 22 be highly uniform as required in the case where the second alignment layer 16A is not used. Namely, as long as the directions of the directors Da and Db of the liquid crystalline molecules on the surfaces 12A, 12B, 22A and 22B of the retardation layers 12 and 22 are substantially the same over the entire areas of the surfaces 12A, 12B, 22A and 22B, respectively, it is not necessary that the helical pitches p in the helical structures of the retardation layers 12 and 22 be constant in planes extending in parallel with the surfaces 12A, 12B, 22A and 22B of the retardation layers 12 and 22, respectively, and they may vary according to changes in film thickness. Similarly, it is not necessary that the pitch numbers in the helical structures of the retardation layers 12 and 22 be constant in planes extending in parallel with the surfaces 12A, 12B, 22A and 22B, and they may vary according to changes in film thickness.

(Second Production Method)

Next, a production method that is employed when a liquid crystalline polymer is used as a material for a retardation layer will be described with reference to FIGS. 6(A) to 6(C).

Figure 6:
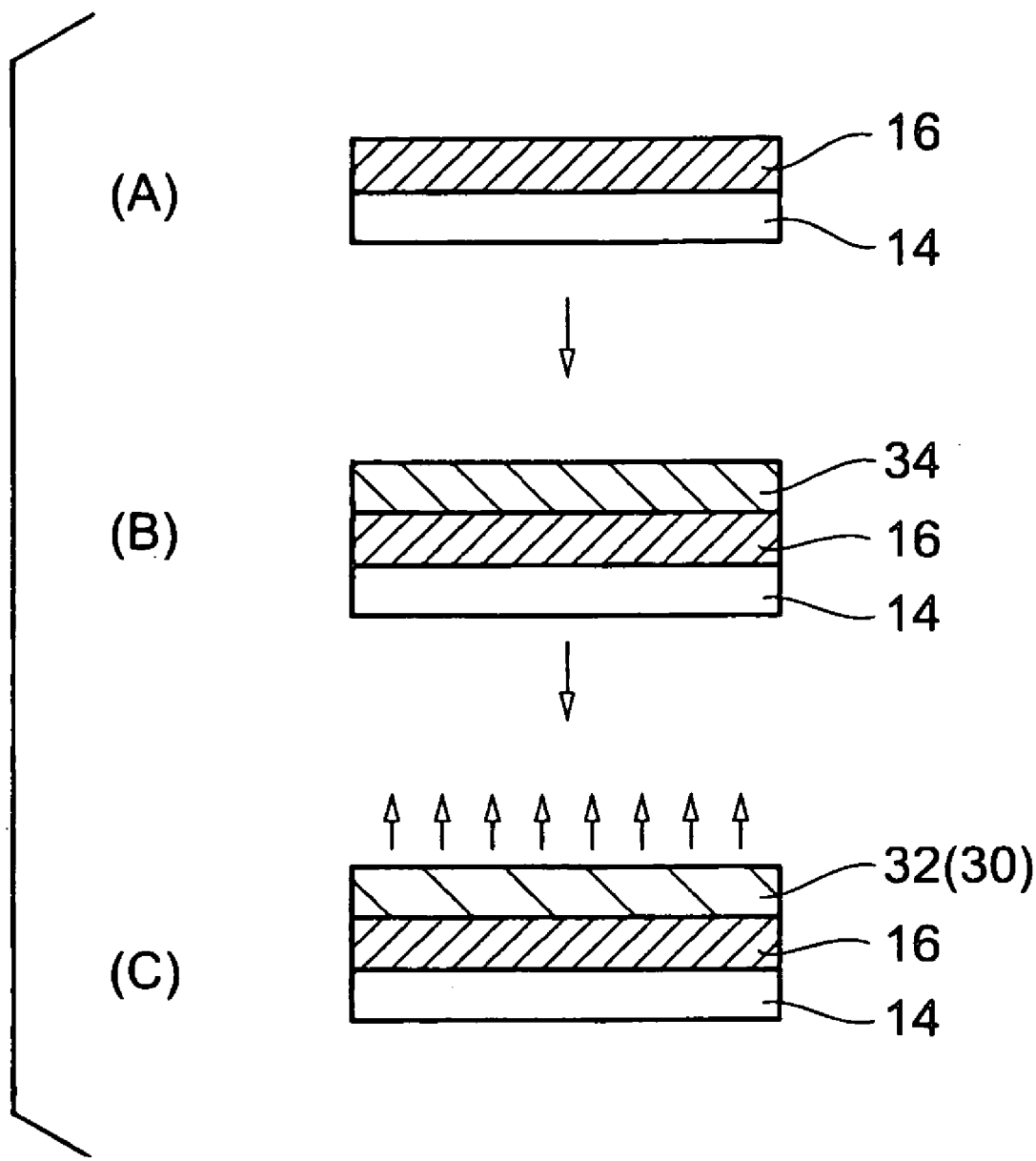
FIG. 6 is a diagrammatic cross-sectional view illustrating a second method of producing a retardation optical element according to an embodiment of the present invention.

In this production method, an alignment layer 16 is previously formed on a glass substrate or a polymeric film 14 such as a TAC film, as shown in FIG. 6(A), like in the above-described production method.

Next, a liquid crystalline polymer 34 having cholesteric regularity is applied to the alignment layer 16, as shown in FIG. 6(B), and is thus aligned by the alignment regulation power of the alignment layer 16. At this time, the applied liquid crystalline polymer 34 forms a liquid crystal layer.

Thereafter, the liquid crystalline polymer 34 is cooled to a temperature below its glass transition temperature (Tg) to make it into a glassy state, as shown in FIG. 6(C). There is thus obtained a retardation optical element 30 composed of a single retardation layer 32.

In this production method, in order to decrease the viscosity of the liquid crystalline polymer 34 so that it can be applied with ease, it may be dissolved in a solvent to obtain a coating liquid. If such a coating liquid is used, it is necessary to effect, before the cooling step, the drying step of evaporating the solvent. Preferably, after effecting the step of applying the coating liquid, the drying step is effected to evaporate the solvent, and the alignment step is then effected to align the liquid crystal.

Further, in the case where a polymeric film such as a TAC film is used as a substrate on which the alignment layer 16 is formed, it is preferable to previously provide a barrier layer on the polymeric film so that the substrate is not damaged by the solvent in which the liquid crystalline polymer 34 is dissolved to obtain the coating liquid; the coating liquid is then applied to this barrier layer.

Cholesteric liquid crystalline polymers having chiral power in themselves, as well as mixtures of nematic liquid crystalline polymers and cholesteric liquid crystalline polymers may be used as the liquid crystalline polymer 34.

The state of such a liquid crystalline polymer 34 changes with temperature. For example, a liquid crystalline polymer 34 having a glass transition temperature of 90° C. and an isotropic transition temperature of 200° C. remains in the state of cholesteric liquid crystal at a temperature between 90° C. and 200° C.; when this polymer is cooled to room temperature, it is solidified into a glassy state with its cholesteric structure maintained.

To control the wavelength of incident light that is selectively reflected by the liquid crystalline polymer 34 owing to its cholesteric-regular molecular structure, the chiral power in the liquid crystalline molecules may be controlled by a conventional method if a cholesteric liquid crystalline polymer is used as the liquid crystalline polymer 34. If a mixture of a nematic liquid crystalline polymer and a cholesteric liquid crystalline polymer is used, it is possible to control the selective reflection wavelength by adjusting the mixing ratio of these two components.

Also in the above-described production method, if the alignment layer 16 has been so formed that its entire surface exerts alignment regulation power in substantially one direction, the directions of the directors of the liquid crystalline molecules on the one surface 12A of the retardation layer 12 that is in contact with the alignment layer 16 can be made substantially the same over the contact face.

Figure 5:
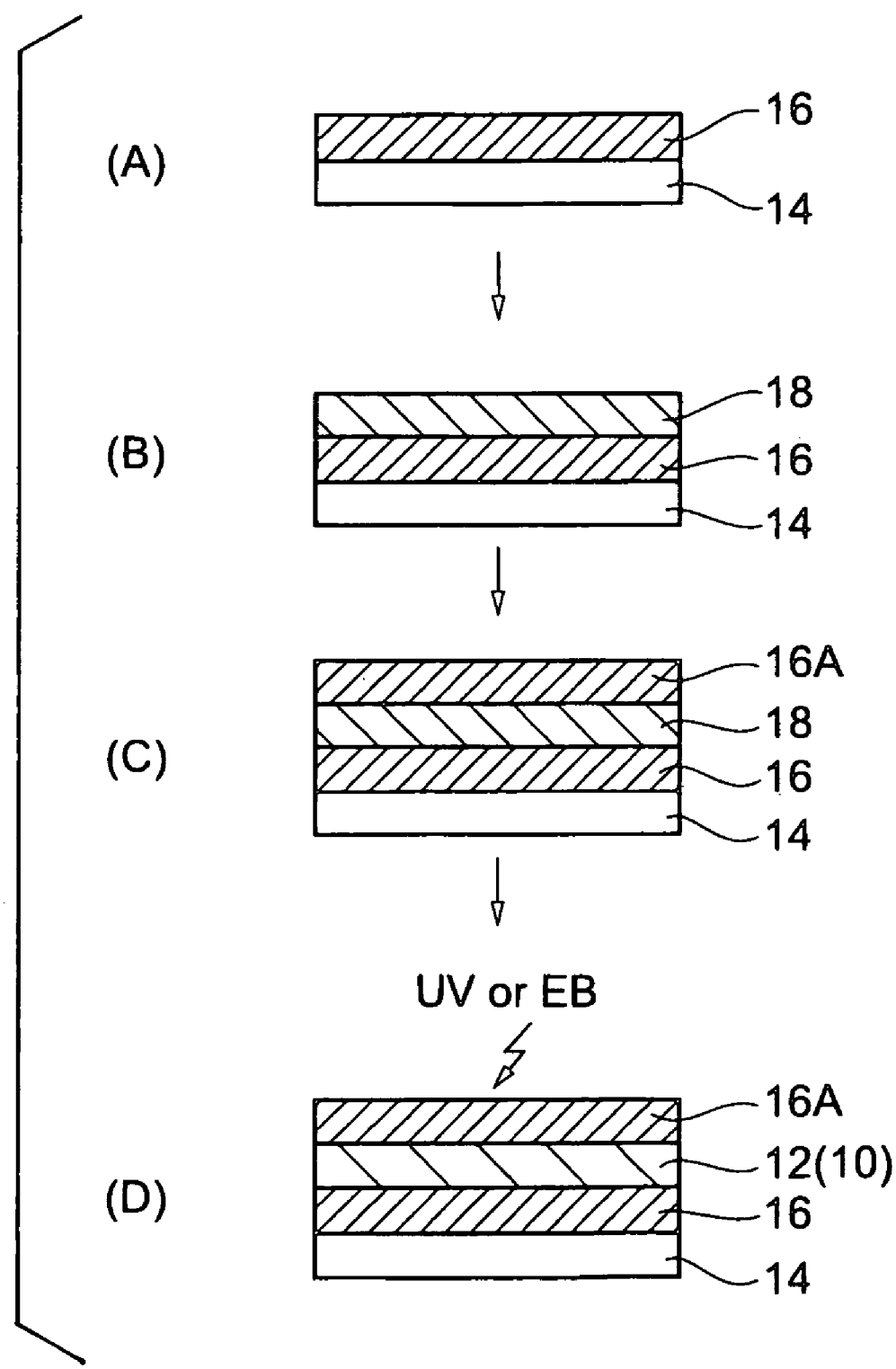
FIG. 5 is a diagrammatic cross-sectional view illustrating a modification of the first method of producing a retardation optical element according to a embodiment of the present invention.

To make the directors Db of the liquid crystalline molecules on the surface 12B that is on the side apart from the alignment layer 16 substantially the same over the entire area of the surface 12B, the thickness of the retardation layer 12 may be made uniform, or a second alignment layer 16A as shown in FIGS. 5(C) and 5(D) may be provided on the surface of the liquid crystalline polymer 34 that is on the side apart from the first alignment layer 16.

Further, to make the directions of the directors of the liquid crystalline molecules on the surface of the retardation layer 32 that is on the side opposite to the alignment layer 16 agree with the direction in which the alignment layer 16 exerts its alignment regulation power (that is, the directions of the directors of the liquid crystalline molecules on the surface of the liquid crystal layer that is in contact with the alignment layer 16), the thickness of the liquid crystal to be applied may be adjusted like in the above-described case so that the thickness of the retardation layer 32 is equal to (0.5×integer) times the helical pitch p in the helical structure consisting of the liquid crystalline molecules, or a second alignment layer 16A as shown in FIGS. 5(C) and 5(D) may be employed. In the case where a second alignment layer 16A is employed, this layer is brought into contact with the surface of the liquid crystalline polymer 34 that is on the side apart from the first alignment layer 16 so that the direction in which the second alignment layer 16A exerts its alignment regulation power agrees with that in which the alignment layer 16 exerts its alignment regulation power.

In the case where a second alignment layer 16A is used in addition to the alignment layer 16 in order to make the directions of the directors Da and Db, of the liquid crystalline molecules on the surfaces 32A and 32B of the retardation layer 32 substantially the same over the entire areas of the surfaces 32A and 32B, respectively, the directions of the directors of the liquid crystalline molecules on the surfaces 32A and 32B of the retardation layer 32 are regulated by the first alignment layer 16 and the second alignment layer 16A, respectively. Therefore, it is not necessary that the thickness of the retardation layer 32 be highly uniform as required in the case where a second alignment layer 16A is not used. Namely, as long as the directions of the directors Da and Db of the liquid crystalline molecules on the surfaces 32A and 32B of the retardation layer 32 are substantially the same over the entire areas of the surfaces 32A and 32B, respectively, it is not necessary that the helical pitch p in the helical structure of the retardation layer 32 be constant in planes extending in parallel with the surfaces 32A and 32B of the retardation layer 32, and the helical pitch p may vary according to changes in film thickness. Similarly, it is not necessary that the pitch number in the helical structure of the retardation layer 32 be constant in planes extending in parallel with the surfaces 32A and 32B, and it may vary according to changes in film thickness.

Each of the retardation optical elements 10, 20 and 30 according to the aforementioned embodiments is composed of a single retardation layer. The embodiments of the invention are not limited to this, and multi-layered retardation optical elements are also acceptable.

Figure 7:
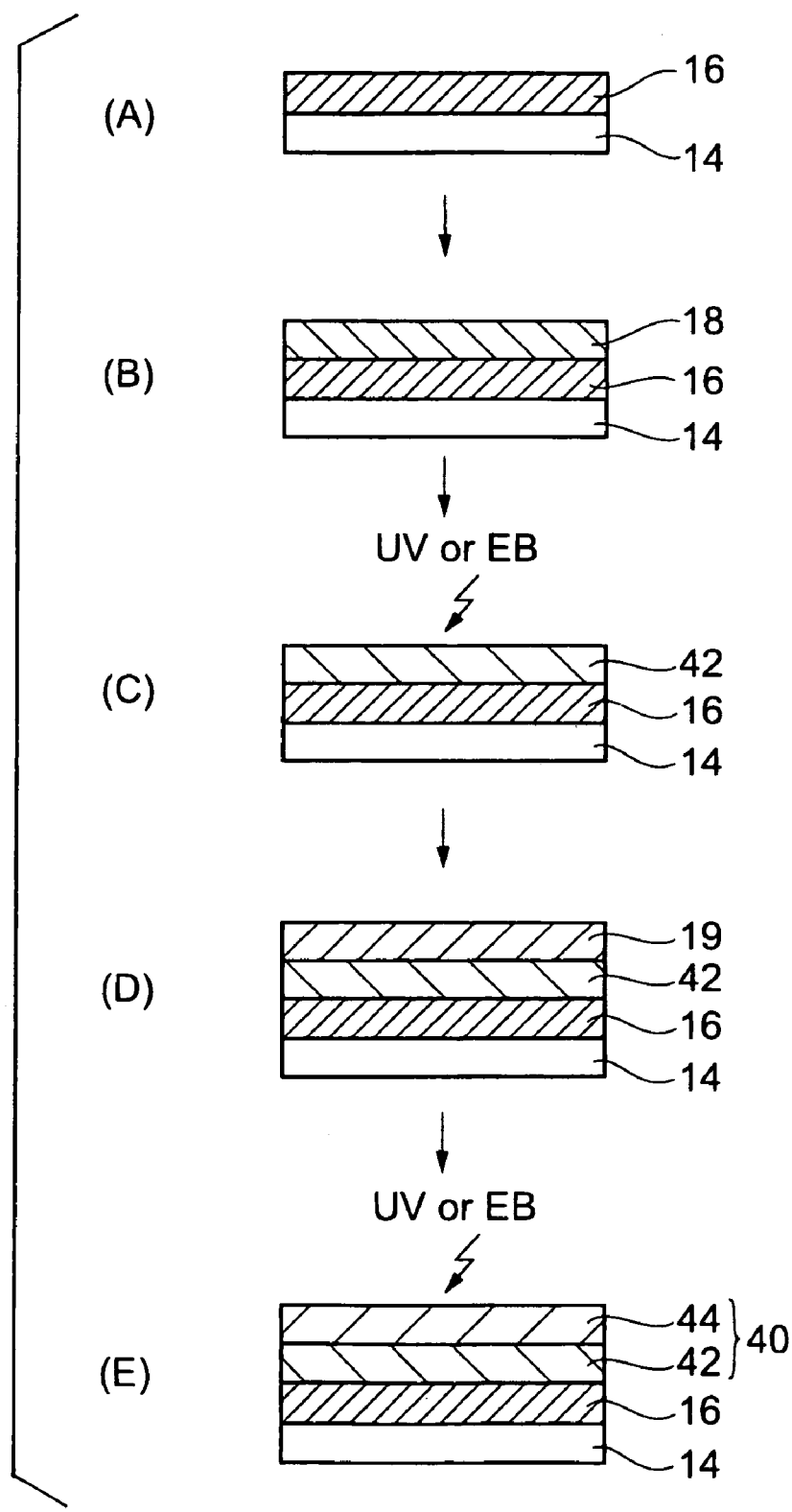
FIG. 7 is a diagrammatic cross-sectional view illustrating a first method of producing a multi-layered retardation optical element that is included in the retardation optical element according to an embodiment of the present invention.

Specifically, like a retardation optical element 40 as shown in FIG. 7(E), multiple retardation layers 42 and 44, each having a cholesteric-regular molecular structure with liquid crystalline molecules in planar orientation, may successively, directly be laminated. In such a multi-layered retardation optical element 40, if those layers that are different in birefringence, helical pitch, or the like are used as the retardation layers 42 and 44, it becomes possible to attain various types of optical compensations.

In this multi-layered retardation optical element 40, the directions of the directors of the liquid crystalline molecules are substantially the same over the entire areas of the two opposite, outermost, main surfaces of the laminate of the liquid crystal layers 42 and 44, respectively, as shown in FIG. 1. Further, it is preferable that the directions of the directors of the liquid crystalline molecules on one of the two opposite, outermost, main surfaces of the laminate of the liquid crystal layers 42 and 44 be substantially parallel with those of the directors of the liquid crystalline molecules on the other surface of the laminate. Furthermore, it is preferable that the directions of the directors of the liquid crystalline molecules in the vicinity of the interface of the two neighboring liquid crystal layers 42 and 44 be substantially parallel with each other.

A method of producing a multi-layered retardation optical element will be described hereinafter.

(First Production Method)

A production method that is employed in the case where polymerizable monomer or oligomer molecules are used as materials for retardation layers is described with reference to FIGS. 7(A) to 7(E).

In this production method, an alignment layer 16 is formed, in advance, on a glass substrate or a polymeric film 14 such as a TAC film, as shown in FIG. 7(A). To this alignment layer 16, polymerizable monomer molecules (or polymerizable oligomer molecules) 18 are applied as liquid crystalline monomers, as shown in FIG. 7(B), and are thus aligned by the alignment regulation power of the alignment layer 16.

Next, while retaining this state of alignment, the polymerizable monomer molecules (polymerizable oligomer molecules) 18 are three-dimensionally crosslinked and solidified, as described above, by the combination use of a photopolymerization initiator and ultraviolet light, or by the application of an electron beam alone, thereby forming a first retardation layer 42.

Figure 8:
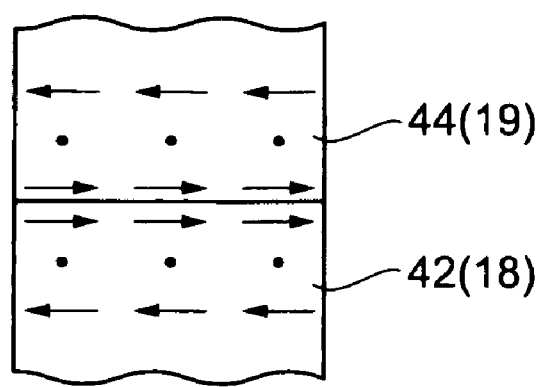
FIG. 8 is a diagrammatic view showing the directors of liquid crystalline molecules on the two adjacent surfaces of each two neighboring layers in a multi-layered retardation optical element that is included in the retardation optical element according to an embodiment of the present invention.

To this three-dimensionally crosslinked first retardation layer 42, another polymerizable monomer molecules (polymerizable oligomer molecules) 19 separately prepared are directly applied as shown in FIG. 7(D), and are aligned, as shown in FIG. 8, by the alignment regulation power of the surface of the three-dimensionally crosslinked first retardation layer 42. While retaining this state of alignment, the polymerizable monomer molecules (polymerizable oligomer molecules) 19 are three-dimensionally crosslinked and solidified, as described above, by the combination use of a photopolymerization initiator and ultraviolet light, or by the application of an electron beam alone, as shown in FIG. 7(E), thereby forming a second retardation layer 44. There is thus produced a two-layered retardation optical element 40.

To obtain a multi-layered retardation optical element composed of three or more retardation layers, the above-described steps (FIGS. 7(D) and 7(E)) are repeatedly effected to successively laminate a required number of retardation layers.

In order to decrease the viscosity of the polymerizable monomer molecules (polymerizable oligomer molecules) 18 and 19 so that they can be applied with ease, these molecules may be dissolved in solvents to obtain coating liquids. If such coating liquids are used, it is necessary to effect the drying step to evaporate the solvents before three-dimensionally crosslinking the polymerizable monomer molecules (polymerizable oligomer molecules) 18 and 19 by the application of ultraviolet light or an electron beam. Preferably, after effecting the step of applying the coating liquid, the drying step is effected to evaporate the solvent, and the alignment step is then effected to align the liquid crystal.

Also in this production method, if the alignment layer 16 has been so formed that its entire surface exerts alignment regulation power in substantially one direction, the directions of the directors of the liquid crystalline molecules that are brought into contact with the alignment layer 16 become substantially the same over the contact face.

To make the directions of the directors of the liquid crystalline molecules on the surface on the side apart from the alignment layer 16 substantially the same over the entire area of this surface, it is enough to make the thickness of the retardation layers 42 and 44 uniform. Alternatively, when the first retardation layer 42 is three-dimensionally crosslinked and solidified, a second alignment layer 16A as shown in FIGS. 5(C) and 5(D) may be provided on the surface of the polymerizable monomer molecules (polymerizable oligomer molecules) 18 that is on the side apart from the surface of the first alignment layer 16. Similarly, when the second retardation layer 44 is three-dimensionally crosslinked and solidified, a second alignment layer may be provided on the surface of the polymerizable monomer molecules (polymerizable oligomer molecules) 19 that is on the side apart from the surface of the first retardation layer 42. In the production of a multi-layered retardation optical element composed of three or more retardation layers, the above steps may be effected for the third and later retardation layers.

Further, to make the directions of the directors of the liquid crystalline molecules on the surface of the first retardation layer 42 that is on the side opposite to the alignment layer 16 agree with the direction in which the alignment layer 16 exerts its alignment regulation power (i.e., the directions of the directors of the liquid crystalline molecules on the surface of the liquid crystal layer that is in contact with the alignment layer 16), or to make the directions of the directors of the liquid crystalline molecules on the surface of the second retardation layer 44 that is on the side opposite to the surface of the first retardation layer 42 agree with the direction in which the first retardation layer 42 exerts its alignment regulation power, the thickness of the liquid crystals to be applied may be adjusted so that the thickness of the first retardation layer 42 and that of the second retardation layer 44 are respectively equal to (0.5× integer) times the helical pitch p in the helical structure consisting of the liquid crystalline molecules, or a second alignment layer 16A as shown in FIGS. 5(C) and 5(D) may be employed. In the case where a second alignment layer 16A is employed, this layer is brought into contact with the surface of the first retardation layer 42 that is on the side opposite to the alignment layer 16, or with the surface of the second retardation layer 44 facing the surface of the first retardation layer 42.

It is herein preferable that both of the liquid crystals that are applied to form the first retardation layer 42 and the second retardation layer 44 have selective reflection wave ranges that are shorter than the wave range of incident light. If the liquid crystals have such selective reflection wave ranges, material transfer does not occur between the first retardation layer 42 and the second retardation layer 44 respectively formed by the application of the liquid crystals. It is therefore possible to produce a retardation optical element 40 as a more uniform laminate of retardation layers and to more effectively control the optical activity caused by the cholesteric-regular molecular structure. In some cases, both of the liquid crystals that are applied to form the first retardation layer 42 and the second retardation layer 44 can have selective reflection wave ranges longer than the wave range of incident light.

Preferably, the liquid crystals that are applied to form the first retardation layer 42 and the second retardation layer 44 are substantially the same material. If so, material transfer scarcely occurs between the first retardation layer 42 and the second retardation layer 44 respectively formed by the application of the liquid crystals. It is therefore possible to produce a retardation optical element 40 as a more uniform laminate of retardation layers.

(Second Production Method)

A production method that is employed when liquid crystalline polymers are used as materials for retardation layers will be described hereinafter with reference to FIGS. 9(A) to 9(C).

Figure 9:
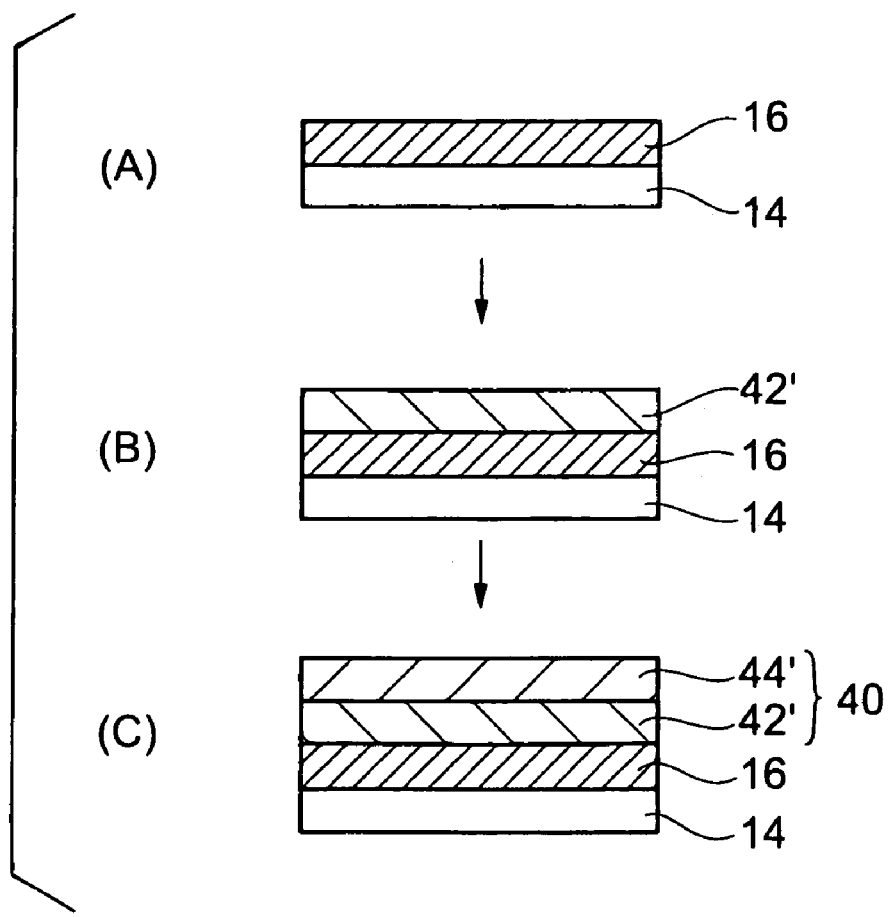
FIG. 9 is a diagrammatic cross-sectional view illustrating a second method of producing a multi-layered retardation optical element that is included in the retardation optical element according to an embodiment of the present invention.

In this production method, an alignment layer 16 is formed, in advance, on a glass substrate or a polymeric film 14 such as a TAC film, as shown in FIG. 9(A), like in the above-described production method.

Next, a liquid crystalline polymer having cholesteric regularity is applied to the alignment layer 16, as shown in FIG. 9(B), and is thus aligned by the alignment regulation power of the alignment layer 16. This liquid crystalline polymer is cooled to a temperature below its glass transition temperature (Tg) to make it into a glassy state, thereby forming a first liquid crystal layer 42'.

Thereafter to this first liquid crystal layer 42', another liquid crystalline polymer having cholesteric regularity, separately prepared, is directly applied, and is aligned by the alignment regulation power of the surface of the first liquid crystal layer 42' that has been made into a glassy state. This liquid crystalline polymer is cooled to a temperature below its glass transition temperature (Tg) to make it into a glassy state, as described above, thereby forming a second liquid crystal layer 44'. There is thus obtained a two-layered retardation optical element 40' including the second liquid crystal layer 44'.

The above-described step (FIG. 9(C)) is repeatedly effected to obtain a multi-layered retardation optical element composed of three or more retardation layers.

Also in the above-described production method, if the alignment layer 16 has been so formed that its entire surface exerts its alignment regulation power in substantially one direction, the directions of the directors of the liquid crystalline molecules that are brought into contact with the alignment layer 16 become substantially the same over the contact face.

To make the directors of the liquid crystalline molecules on the surface on the side apart from the alignment layer 16 substantially the same over the entire area of this surface, the thickness of the retardation layers 42' and 44' may be made uniform, or a second alignment layer 16A as shown in FIGS. 5(C) and 5(D) may be provided on the surface of the polymerizable monomer molecules (polymerizable oligomer molecules) 18 that is on the side apart from the surface of the first alignment layer 16, when the first retardation layer 42' is three-dimensionally crosslinked and solidified. Similarly, when the second retardation layer 44' is three-dimensionally crosslinked and solidified, a second alignment layer may be provided on the surface of the polymerizable monomer molecules (polymerizable oligomer molecules) 19 that is on the side apart from the surface of the first retardation layer 42'. In the production of a multi-layered retardation optical element composed of three or more retardation layers, these steps may be effected for the third and later retardation layers.

Further, to make the directions of the directors of the liquid crystalline molecules on the surface of the first retardation layer 42' that is on the side opposite to the alignment layer 16 agree with the direction in which the alignment layer 16 exerts its alignment regulation power (that is, the directions of the directors of the liquid crystalline molecules on the surface of the liquid crystal layer that is in contact with the alignment layer 16), and to make the directions of the directors of the liquid crystalline molecules on the surface of the second retardation layer 44' that is on the side opposite to the surface of the first retardation layer 42' agree with the direction in which the first retardation layer 42' exerts its alignment regulation power, the thickness of the liquid crystal layers to be applied is adjusted like in the above-described production method so that the thickness of the first retardation layer 42' and that of the second retardation layer 44' are respectively equal to (0.5×integer) times the helical pitch p in the helical structure consisting of the liquid crystalline molecules, or a second alignment layer 16A as shown in FIGS. 5(C) and 5(D) is employed. In the case where a second alignment layer 16A is employed, this layer is brought into contact with the surface of the first retardation layer 42' that is on the side opposite to the alignment layer 16, or with the surface of the second retardation layer 44' facing the surface of the first retardation layer 42'.

Next, polarization elements including the retardation optical elements 10, 20, 30 and 40 according to the aforementioned embodiments will be described with reference to FIG. 10.

As shown in FIG. 10, a polarization element 50 includes a polarizing layer 51, and a retardation optical element 10 (20, 30, 40) arranged on the light-entering-side surface of the polarizing layer 51. Although the retardation optical element 10 (20, 30, 40) and the polarizing layer 51 are depicted in FIG. 10 as being separated from each other, they are actually in the state of being adhered to each other.

If the polarizing layer 51 is adhered to the retardation optical element 10 (20, 30, 40), the reflection of light on the retardation optical element 10 (20, 30, 40) is remarkably decreased. Therefore, the appearance of bright and dark fringes is effectively prevented, and, at the same time, contrast is improved. It is thus possible to effectively prevent lowering of display quality.

It is herein preferable that the directions 52 of the directors of the liquid crystalline molecules on the one surface (light-entering-side surface) of the retardation optical element 10 (20, 30, 40) and the directions 53 of the directors of the liquid crystalline molecules on the other surface (light-emerging-side surface) of the retardation optical element 10

(20, 30, 40) be substantially parallel with or perpendicular to the axis 54 of absorption of the polarizing layer 51.

Further, the retardation optical elements 10, 20, 30 and 40 according to the aforementioned embodiments can be incorporated in liquid crystal displays 60 as shown in FIG. 11, for example.

The liquid crystal display 60 shown in FIG. 11 includes a polarizer 102A on the light-entering side, a polarizer 102B on the light-emerging side, and a liquid crystal cell 104.

Of these component parts, the polarizers 102A and 102B are so constructed that they selectively transmit only linearly polarized light having the plane of vibration in a predetermined direction, and are arranged in the cross nicol disposition so that the direction of vibration of the linearly polarized light transmitted by the polarizer 102A is perpendicular to that of vibration of the linearly polarized light transmitted by the polarizer 102B. The liquid crystal cell 104 includes a large number of cells corresponding to pixels, and is placed between the two polarizers 102A and 102B.

It is herein preferable that the directions 52 of the directors of the liquid crystalline molecules on the one surface (light-entering-side surface) of the retardation optical element 10 (20, 30, 40) be parallel with the axis 51 of absorption of the polarizer 102A arranged on the light-entering side and be perpendicular to the axis 54 of absorption of the polarizer 102B arranged on the light-emerging side. It is also preferable that the directions 53 of the directors of the liquid crystalline molecules on the other surface (light-emerging-side surface) of the retardation optical element 10 (20, 30, 40) be perpendicular to the axis 51 of absorption of the polarizer 102A arranged on the light-entering side and be parallel with the axis 54 of absorption of the polarizer 102B arranged on the light-emerging side.

In the liquid crystal display 60, the liquid crystal cell 104 is of VA mode, which a nematic liquid crystal having negative dielectric anisotropy is sealed in a liquid crystal cell. Linearly polarized light that has passed through the polarizer 102A arranged on the light-entering side passes, without undergoing phase shift, through those cells in the liquid crystal cell 104 that are in the non-driven state, and is blocked by the polarizer 102B on the light-emerging side. On the contrary, when the linearly polarized light passes through those cells in the liquid crystal cell 104 that are in the driven state, it undergoes phase shift, and this phase-shifted light passes through and emerges from the polarizers 102B arranged on the light-emerging side in an amount corresponding to the amount of this phase shift. It is therefore possible to display the desired image on the polarizer 102B side (i.e., on the light-emerging side) by properly controlling the driving voltage that is applied to each cell in the liquid crystal cell 104.

In the liquid crystal display 60 having the above-described construction, the retardation optical element 10 (20, 30, 40) according to the above-described embodiment is placed between the liquid crystal cell 104 and the polarizer 102B on the light-emerging side (the polarizer capable of selectively transmitting light emerging from the liquid crystal cell 104, the light being in the predetermined state of polarization). Of the light emerging from the liquid crystal cell 104, a part of the light in the predetermined state of polarization that slantingly emerges in the direction deviating from the normal of the liquid crystal cell 104 can be optically compensated by the retardation optical element 10 (20, 30, 40) for the state of polarization.

As mentioned above, according to the liquid crystal display 60 having the above-described construction, the retardation optical element 10 (20, 30, 40) according to the above-described embodiment is placed between the liquid crystal cell 104 and the polarizer 102B on the light-emerging side so that, of the light emerging from the liquid crystal cell 104, a part of the light that slantingly emerges in the direction deviating from the normal of the liquid crystal cell 104 can be optically compensated by the retardation optical element for the state of polarization. It is therefore possible to prevent the appearance of bright and dark fringes on the liquid crystal display 60 and to improve contrast, while effectively eliminating the viewing angle dependency problem. There can thus be prevented the lowering of display quality.

The liquid crystal display 60 shown in FIG. 11 is of transmission type, which light is transmitted from one side to the other in the direction of thickness. The present embodiment is not limited to this, and the retardation optical element 10 (20, 30, 40) according to the aforementioned embodiment may be incorporated in a liquid crystal display of reflection type.

Further, in the liquid crystal display 60 shown in FIG. 11, the retardation optical element 10 (20, 30, 40) according to the above-described embodiment is placed between the liquid crystal cell 104 and the polarizer 102B on the light-emerging side. However, depending on the type of optical compensation required, the retardation optical element 10 (20, 30, 40) may be placed between the liquid crystal cell 104 and the polarizer 102A on the light-entering side. Furthermore, the retardation optical element 10 (20, 30, 40) may be arranged on both sides of the liquid crystal cell 104 (between the liquid crystal cell 104 and the polarizer 102A on the light-entering side, and between the liquid crystal cell 104 and the polarizer 102B on the light-emerging side). It is noted that not only one but also two or more retardation optical elements may be placed between the liquid crystal cell 104 and the polarizer 102A on the light-entering side, or between the liquid crystal cell 104 and the polarizer 102B on the light-emerging side.

EXAMPLES

The aforementioned embodiments of the invention will now be explained more specifically by referring to the following Examples and Comparative Examples.

Example 1

In Example 1, a single retardation layer was made from polymerizable monomer molecules, where the thickness of the retardation layer was made uniform in order to make the directions of the directors of the liquid crystalline molecules the same. In Example 1, the single retardation layer was formed on a glass substrate.

A toluene solution was prepared by dissolving, in toluene, 90 parts of a monomer containing, in its molecule, polymerizable acrylates at both ends and spacers between mesogen existing at the center and the acrylates, having a nematic-isotropic transition temperature of 110° C. (a monomer having a molecular structure represented by the above chemical formula (11)) and 10 parts of a chiral agent having, in its molecules, polymerizable acrylates at both ends (a compound having a molecular structure represented by the above chemical formula (14)). To this toluene solution, a photopolymerization initiator ("Irgacure® 907" available from Ciba Specialty Chemicals K.K., Japan) was added in an amount of 5% by weight of the above-described monomer. (With respect to the chiral nematic liquid crystal thus obtained, it was confirmed that the directors of the liquid crystalline molecules on the surface of the liquid crystal layer that was in contact with the surface of the alignment layer were in one direction with a deviation of ±5 degrees.)

On the other hand, a transparent glass substrate was spin-coated with polyimide ("Optomer® AL1254" manufactured by JSR Corporation, Japan) dissolved in a solvent. After drying, a film of the polyimide (film thickness: 0.1 μm) was formed at 200° C., and was rubbed in one direction so that it could function as an alignment layer.

The glass substrate coated with the alignment layer was set in a spin-coater, and was spin-coated with the toluene solution prepared by dissolving above-described monomer and other components in toluene, under the conditions that the thickness of the resulting film would be as uniform as possible.

The toluene contained in the above toluene solution was then evaporated at 80° C. to form a coating film on the alignment layer. It was visually confirmed by the selective reflection of light that this coating film was cholesteric.

Ultraviolet light was applied to the above coating film, and with radicals thus released from the photopolymerization initiator contained in the coating film, the acrylates in the monomer molecules were three-dimensionally crosslinked and polymerized to obtain a single-layered retardation optical element. The thickness of the coating film was 2 μm±1.5%. By the measurement made by using a spectrophotometer, it was found that the central wavelength of the selective reflection wave range of the coating film was 280 nm.

The retardation optical element thus produced was subjected to measurements using an automatic birefringence measuring apparatus ("KOBRA® 21ADH" manufactured by Oji Scientific Instruments K.K., Japan). As a result, the phase shift that occurred in the direction of plane was found to be several nanometers, this value being within the limit of error of the measuring apparatus, and the phase shift that occurred in the direction of thickness was found to be approximately 100 nm. It was thus confirmed that the retardation optical element was functioning as a negative C plate.

Figure 12:
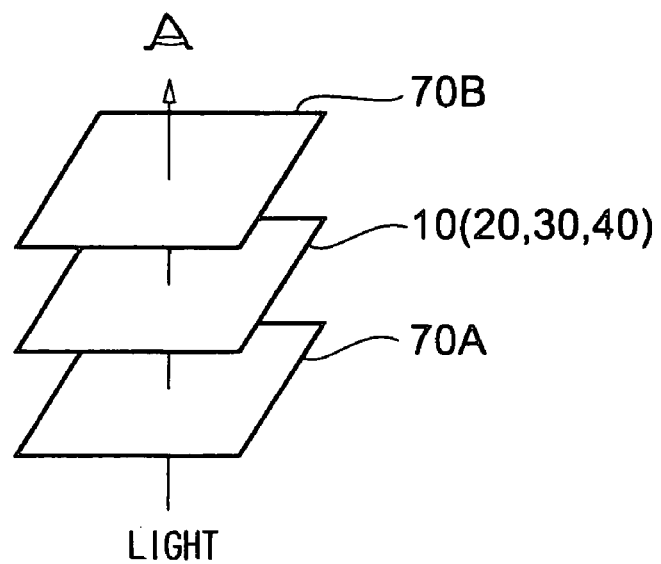
FIG. 12 is a diagrammatic exploded perspective view showing a disposition in a case where a retardation optical element sandwiched between the polarizers is observed.
Figure 13:
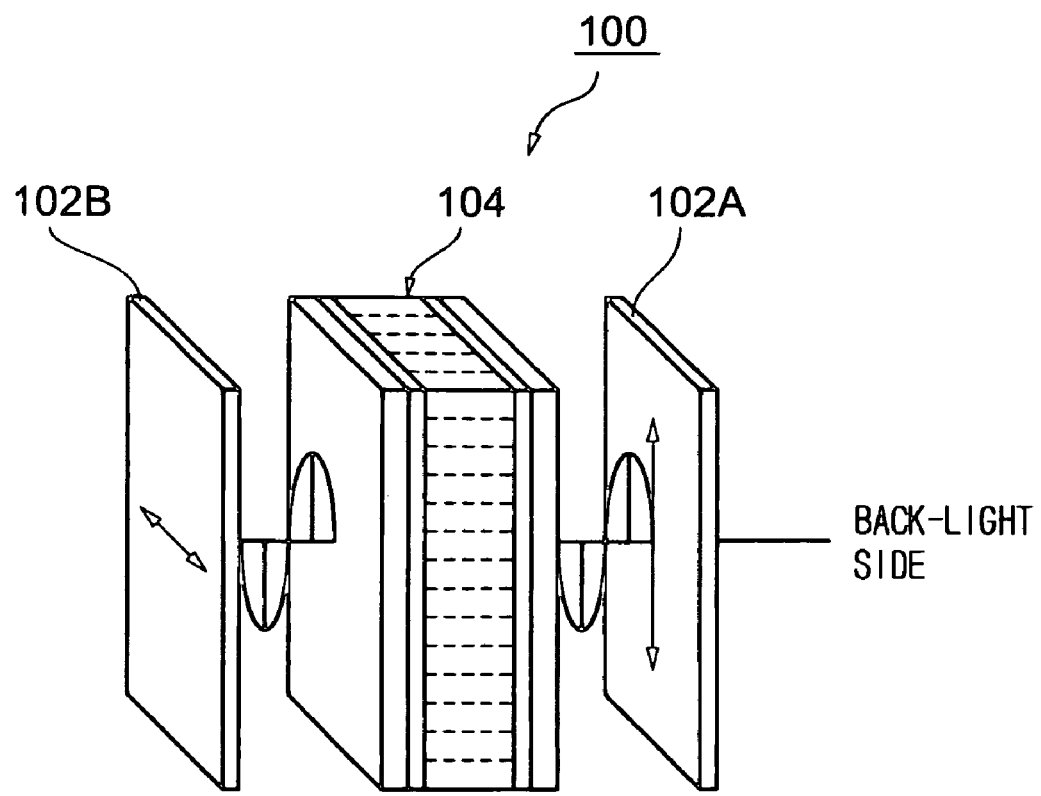
FIG. 13 is a diagrammatic exploded perspective view of a conventional liquid crystal display.

Further, as shown in FIG. 12, linear polarizers 70A and 70B were arranged in the cross nicol disposition, and the retardation optical element 10 thus produced was placed between them and was visually observed. The bright and dark fringes observed on the plane were very few.

Example 2

In Example 2, a single retardation layer of polymerizable monomer molecules was formed on a polymeric film. Namely, a retardation optical element was produced in the same manner as in Example 1, provided that a PVA solution prepared by dissolving 2% by weight of PVA in pure water was applied to a transparent TAC film by bar coating and was dried, after which a film (film thickness: 0.2 μm) was formed at 100° C. and was rubbed in one direction so that it could function as an alignment layer. The retardation optical element thus produced was subjected to the same measurements as those made in Example 1. The results of the measurements were found to be similar to those obtained in Example 1.

Comparative Example 1

In Comparative Example 1, a single retardation layer was made from polymerizable monomer molecules, where the thickness of the retardation layer was made non-uniform in order to make the directions of the directors of the liquid crystalline molecules different from one another. Namely, a retardation optical element was produced in the same manner as in Example 1, provided that the thickness of the retardation layer was made 2 μm±5% by changing the settings of the spin-coater. The retardation optical element thus produced was visually observed in the same manner as in Example 1. As a result, bright and dark fringes were clearly observed on the plane.

Comparative Example 2

In Comparative Example 2, the surface of an alignment layer on which a single retardation layer of polymerizable monomer molecules would be formed was rubbed in various directions in order to make the directions of the directors of the liquid crystalline molecules different from one another. Namely, a retardation optical element was produced in the same manner as in Example 1, provided that the surface of the alignment layer was rubbed in various directions. The retardation optical element thus produced was visually observed in the same manner as in Example 1. As a result, bright and dark fringes were clearly observed on the plane.

Example 3

In Example 3, a single retardation layer was made from polymerizable monomer molecules, where the thickness of the retardation layer was made uniform and the helical pitch was made constant in order to make the directions of the directors of the liquid crystalline molecules on the two opposite main surfaces of the retardation layer parallel with each other. Namely, a retardation optical element was produced in the same manner as in Example 1, provided that the thickness of the retardation layer was so adjusted that the directions of the directors at the starting point and the end point of the cholesteric-regular molecular structure would be parallel with each other, allowing for the refractive index of the material to be used. The retardation optical element thus produced was observed in the same manner as in Example 1. As a result, it was found that the bright and dark fringes observed on the plane were obviously fewer than those fringes observable in the case where the thickness of the retardation optical element was not made as described above.

The linear polarizers 70A and 70B arranged on both sides of the retardation optical element 20 (see FIG. 12) were respectively rotated, and visual observation was made to determine, by the intensity of transmitted light, the angle made by the directions of the directors at the starting point and the end point of the cholesteric-regular molecular structure of the retardation optical element 20. As a result, it was confirmed that this angle was within ±5 degrees.

Example 4

In Example 4, multiple retardation layers were made from polymerizable monomer molecules, where the total thickness of the retardation layers was made uniform in order to make the directions of the directors of the liquid crystalline molecules the same.

The retardation optical element produced in Example 1 was used as the first retardation layer. The surface of this retardation optical element that was on the side opposite to the alignment layer was spin-coated with a toluene solution prepared in the same manner as in Example 1, at a number of revolutions greater than that in Example 1.

Next, the toluene contained in the toluene solution was evaporated at 80° C. to form a film on the first retardation layer. This coating film was visually observed, and it was confirmed by the selective reflection of light that the coating film was cholesteric.

Ultraviolet light was applied to the above coating film, and with radicals thus released from the photopolymerization initiator contained in the coating film, the acrylates in the monomer molecules were three-dimensionally crosslinked and polymerized to form a second retardation layer. There was thus produced a multi-layered retardation optical element. The total thickness of this retardation optical element was 3.5 µm±1.5%. From the measurement made by using a spectrophotometer, it was found that the central wavelength of the selective reflection wave range of the retardation optical element composed of the multiple retardation layers was 280 nm.

The cross section of the multiple retardation layers was observed by a transmission electron microscope. As a result, the bright and dark fringes that appeared on the polymerized retardation layers were found to be parallel with each other (from this, it can be known that the directions of the helical axes agree with each other). In addition, no discontinuity was found between the retardation layers (from this, it can be known that the directions of the directors of the liquid crystalline molecules on the two adjacent surfaces of the neighboring retardation layers coincide with each other).

Further, as shown in FIG. 12, linear polarizers 70A and 70B were arranged in the cross nicol disposition, and the above-obtained retardation optical element 40 was placed between them and was visually observed. The bright and dark fringes observed on the plane were very few.

Comparative Example 3

In Comparative Example 3, multiple retardation layers were made from polymerizable monomer molecules, where the total thickness of the retardation layers was made non-uniform in order to make the directions of the directors of the liquid crystalline molecules different from one another. Namely, a retardation optical element was produced in the same manner as in Example 3, provided that the total thickness of the retardation layers was made 3.5 µm±5% by changing the settings of the spin-coater. The retardation optical element thus produced was visually observed in the same manner as in Example 3. As a result, bright and dark fringes were clearly observed on the plane.

Example 5

In Example 5, multiple retardation layers were made from liquid crystalline polymers, where the total thickness of the retardation layers was made uniform in order to make the directions of the directors of the liquid crystalline molecules the same.

A toluene solution was prepared by dissolving, in toluene, a liquid crystalline polymer containing acrylic side chains, having a glass transition temperature of 80° C. and an isotropic transition temperature of 200° C. (With respect to the polymeric, cholesteric liquid crystal thus obtained, it was confirmed that the directors of the liquid crystalline molecules on the surface of the liquid crystal layer that was in contact with the surface of the alignment layer were in one direction with a deviation of ±5 degrees.)

On the other hand, polyimide ("Optomer® AL1254" manufactured by JSR Corporation, Japan) dissolved in a solvent was applied to a transparent glass substrate by spin-coating and was dried, after which a film (film thickness: 0.1 µm) was formed at 200° C. and was rubbed in one direction so that it could function as an alignment layer.

The glass substrate coated with the alignment layer was set in a spin-coater, and was spin-coated with the toluene solution prepared by dissolving the above-described liquid crystalline polymer in toluene, under the conditions that the thickness of the resulting film would be as uniform as possible.

The toluene contained in the above toluene solution was then evaporated at 90° C. to form, on the alignment layer, a coating film, which was held at 150° C. for 10 minutes. This coating film was visually observed, and it was confirmed by the selective reflection of light that the coating film was cholesteric. Subsequently, the coating film was cooled to room temperature to make the liquid crystalline polymer into a glassy state and to fix it to this state, thereby forming a first retardation layer. The thickness of this retardation layer was 2 µm±1.5%. By the measurement made by using a spectrophotometer, it was confirmed that the central wavelength of the selective reflection wave range of the first retardation layer was 370 nm.

To the first retardation layer that had been made into and fixed to a glassy state, a liquid crystalline polymer containing acrylic side chains, having a glass transition temperature of 75° C. and an isotropic transition temperature of 190° C., dissolved in toluene, was applied by spin-coating at a number of revolutions greater than before.

The toluene contained in the above toluene solution was then evaporated at 90° C. to form a film, which was held at 150° C. for 10 minutes. This coating film was visually observed, and it was confirmed by the selective reflection of light that the coating film was cholesteric. Subsequently, this coating film was cooled to room temperature to make the liquid crystalline polymer into a glassy state and to fix it to this state, thereby forming a second retardation layer. Thus, there was obtained a multi-layered retardation optical element. The total thickness of this retardation optical element was 3.5 µm±1.5%. By the measurement made by using a spectrophotometer, it was found that the central wavelength of the selective reflection wave range of the multi-layered retardation optical element was 370 nm.

The cross section of the multiple retardation layers was observed by a transmission electron microscope. As a result, the bright and dark fringes that appeared on the fixed retardation layers were found to be parallel with each other (from this, it can be known that the directions of the helical axes agree with each other). In addition, no discontinuity was found between the retardation layers (from this, it can be known that the directions of the directors of the liquid crystalline molecules on the two adjacent surfaces of the neighboring retardation layers coincide with each other). Further, in the measurement made by a spectrophotometer, no optical peculiarity was observed in transmittance.

Linear polarizers 70A and 70B were arranged in the cross nicol disposition, as shown in FIG. 12, and the retardation optical element 40 thus produced was placed between them and was visually observed. The bright and dark fringes observed on the plane were very few.

Comparative Example 4

In Comparative Example 4, multiple liquid crystal layers were made from liquid crystalline polymers, where the total thickness of the liquid crystal layers was made non-uniform in order to make the directions of the directors of the liquid crystalline molecules different from one another. Namely, a retardation optical element was produced in the same manner as in Example 5, provided that the total thickness of the retardation layers was made 3.5 μm±5% by changing the settings of the spin-coater. The retardation optical element thus produced was visually observed in the same manner as in Example 5. As a result, bright and dark fringes were clearly observed on the plane.

What is claimed is:

1. A retardation optical element comprising a retardation layer having a cholesteric-regular molecular structure with liquid crystalline molecules in planar orientation, a helical pitch in the molecular structure being so adjusted that a wavelength of light selectively reflected by the retardation layer due to its molecular structure falls in a range shorter than a wave range of incident light to achieve smaller optical activity,
   wherein directions of directors of liquid crystalline molecules on one surface of two opposite main surfaces of the retardation layer are substantially the same, and those of directors of the liquid crystalline molecules on the other surface of the retardation layer are also substantially the same, and
   wherein the directions of the directors of the liquid crystalline molecules on the one surface of the retardation layer are substantially parallel with those of the directors of the liquid crystalline molecules on the other surface of the retardation layer.

2. The retardation optical element according to claim 1, wherein dispersion in the directions of the directors of the liquid crystalline molecules on each of the one surface and the other surface of the retardation layer is within ±10°.

3. The retardation optical element according to claim 1, wherein an angle made by the directions of the directors of the liquid crystalline molecules on the one surface of the retardation layer and those of the directors of the liquid crystalline molecules on the other surface of the retardation layer is within ±10°.

4. The retardation optical element according to claim 1, wherein the retardation layer has a helical structure with a pitch number of substantially (0.5×integer) between the directions of the directors of the liquid crystalline molecules on the one surface of the retardation layer and those of the directors of the liquid crystalline molecules on the other surface of the retardation layer.

5. The retardation optical element according to claim 4, wherein an angle made by the directions of the directors of the liquid crystalline molecules on the one surface of the retardation layer and those of the directors of the liquid crystalline molecules on the other surface of the retardation layer is within ±10°.

6. The retardation optical element according to claim 4, wherein the helical structure of the retardation layer has a helical pitch or a pitch number that varies depending upon position in a plane extending in parallel with the one surface and the other surface of the retardation layer.

7. The retardation optical element according to claim 1, wherein the retardation layer is composed of successively, directly laminated multiple layers, each having a cholesteric-regular molecular structure with liquid crystalline molecules in planar orientation, and directions of directors of the liquid crystalline molecules on two adjacent surfaces of each two neighboring layers among the multiple layers are substantially parallel with each other.

8. The retardation optical element according to claim 1, wherein the retardation layer has a molecular structure in which chiral nematic liquid crystalline molecules are three-dimensionally crosslinked.

9. A polarization element comprising:
   a polarizing layer; and
   a retardation optical element according to claim 1, provided on a surface of the polarizing layer.

10. The polarization element according to claim 9, wherein the directions of the directors of the liquid crystalline molecules on the one surface or the other surface of the retardation optical element are substantially parallel with or perpendicular to an axis of absorption of the polarizing layer.

11. A liquid crystal display comprising:
    a liquid crystal cell;
    a pair of polarizers so arranged that the liquid crystal cell is sandwiched therebetween; and
    a retardation optical element according to claim 1, placed between the liquid crystal cell and at least one of the paired polarizers,
    wherein, of light in a predetermined state of polarization, emerging from the liquid crystal cell, a part of light that emerges slantingly in a direction deviating from the normal of the liquid crystal cell is compensated by the retardation optical element for the sate of polarization.

12. The liquid crystal display according to claim 11, wherein the directions of the directors of the liquid crystalline molecules on the one surface or the other surface of the retardation optical element are substantially parallel with or perpendicular to an axis of absorption of each one of the polarizers.

13. A method of producing a retardation optical element, comprising:
    applying a first liquid crystal comprising a liquid crystalline polymer having cholesteric regularity to an alignment layer that has been so formed that a surface thereof exerts alignment regulation power in substantially one direction, thereby aligning the first liquid crystal by the alignment regulation power of the surface of the alignment layer; and
    solidifying the aligned first liquid crystal into a glassy state by cooling, thereby forming a first retardation layer that selectively reflects light whose wavelength falls in a range shorter than a wave range of incident light to achieve smaller optical activity,
    wherein a thickness of the first liquid crystal that is applied to the surface of the alignment layer is so adjusted that directions of directors of the liquid crystalline molecules on a surface of two opposite main surfaces of the first retardation layer, which surface is not controlled by the alignment regulation power of the surface of the alignment layer, are regulated, and
    wherein the directions of the directors of the liquid crystalline molecules on the one surface of the retardation layer are substantially parallel with those of the directors of the liquid crystalline molecules on the other surface of the retardation layer.

14. The method according to claim 13, further comprising the steps of:
    directly applying, to the first retardation layer, a second liquid crystal comprising another liquid crystalline polymer having cholesteric regularity, thereby aligning the second liquid crystal by the alignment regulation power of the surface of the first retardation layer; and
    solidifying the aligned second liquid crystal into a glassy state by cooling, thereby forming a second retardation layer that selectively reflects light whose wavelength falls in a range different from the wave range of incident light.

15. The method according to claim 14, wherein, in at least one step of the step of forming the first retardation layer and that of forming the second retardation layer, a thickness of the first or second liquid crystal that is applied to the surface of the alignment layer or of the first retardation layer is so adjusted that directions of directors of the liquid crystalline molecules on a surface of two opposite main surfaces of the first or second retardation layer, which surface is not controlled by the alignment regulation power of the surface of the alignment layer or of the first retardation layer, are regulated.

16. The method according to claim 14, wherein, in at least one step of the step of forming the first retardation layer and that of forming the second retardation layer, another alignment layer is brought into contact with a surface of the first or second liquid crystal applied to the surface of the alignment layer or of the first retardation layer, the contacting surface being on a side apart from the surface of the alignment layer or of the first retardation layer, in order to regulate directions of directors of the liquid crystalline molecules on a surface of two opposite main surfaces of the first or second retardation layer, which surface is not controlled by the alignment regulation power of the surface of the alignment layer or of the first retardation layer.

17. The method according to claim 14, wherein both of the first and second liquid crystals that are applied to form the first and second retardation layers, respectively, have selective reflection wave ranges that are either shorter or longer than the wave range of incident light.

18. The method according to claim 14, wherein the first and second liquid crystals that are applied to form the first and second retardation layers, respectively, comprise substantially the same material.

* * * * *